(12) United States Patent
DeSimone et al.

(10) Patent No.: US 7,435,495 B2
(45) Date of Patent: Oct. 14, 2008

(54) LIQUID MATERIALS FOR USE IN ELECTROCHEMICAL CELLS

(75) Inventors: Joseph M. DeSimone, Durham, NC (US); Jennifer Y. Kelly, Chapel Hill, NC (US); Jason P. Rolland, Durham, NC (US); Zhillian Zhou, Chapel Hill, NC (US); Ginger M. Denison, Durham, NC (US); Raymond Dominey, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 58 days.

(21) Appl. No.: 11/040,317

(22) Filed: Jan. 21, 2005

(65) Prior Publication Data

US 2006/0083971 A1    Apr. 20, 2006

Related U.S. Application Data

(60) Provisional application No. 60/538,706, filed on Jan. 23, 2004, provisional application No. 60/538,878, filed on Jan. 23, 2004.

(51) Int. Cl.
 *C08J 5/20* (2006.01)
(52) U.S. Cl. .......................... 429/30; 429/33; 427/115; 502/101; 521/25
(58) Field of Classification Search .................. 429/30, 429/33; 521/25; 427/115; 502/101
See application file for complete search history.

(56) References Cited

U.S. PATENT DOCUMENTS

| 6,500,894 B1 * | 12/2002 | Lenti et al. .................. 524/507 |
| 6,632,571 B2 | 10/2003 | Noh |
| 6,645,675 B1 | 11/2003 | Munshi |
| 7,045,479 B2 * | 5/2006 | Zhou et al. .................. 502/125 |
| 2003/0013602 A1 * | 1/2003 | Uchida et al. ................ 502/101 |
| 2003/0044688 A1 | 3/2003 | Kang et al. |
| 2003/0049538 A1 | 3/2003 | Buerger et al. |
| 2003/0059683 A1 | 3/2003 | Blau et al. |

(Continued)

FOREIGN PATENT DOCUMENTS

WO    WO 99/16138    4/1999

(Continued)

OTHER PUBLICATIONS

Bae, B., et al., "Nafion®-*graft*-Polystyrene Sulfonic Acid Membranes for Direct Methanol Fuel Cells," *Journal of Membrane Science*, 2006, pp. 51-58, vol. 276.

(Continued)

*Primary Examiner*—Peter D. Mulcahy
*Assistant Examiner*—Henry Hu
(74) *Attorney, Agent, or Firm*—Alston & Bird LLP

(57) ABSTRACT

Disclosed is the use of liquid precursor materials to prepare a processible polymeric electrolyte, which can be used to form a proton exchange membrane for use in an electrochemical cell. Also disclosed is the use of liquid precursor materials to prepare a processible catalyst ink composition, which can be conformally applied to a proton exchange membrane and an electrode material for use in an electrochemical cell. Also disclosed is the use of a photocurable perfluoropolyether (PFPE) material to form a microfluidic electrochemical cell.

10 Claims, 19 Drawing Sheets

U.S. PATENT DOCUMENTS

2004/0258990 A1* 12/2004 McLean et al. ............ 429/188
2005/0112433 A1    5/2005 Apte et al. ................. 429/30

FOREIGN PATENT DOCUMENTS

WO     WO 03/095552 A1    11/2003
WO     WO 2005/030822 A2   4/2005
WO     WO-2005/086632 A2 * 9/2005

OTHER PUBLICATIONS

Büchi, F.N., et al., "Study of Radiation-Crafted FEP-g-Polystryrene Membranes as Polymer Electrolytes in Fuel Cells," *Electrochimica Acta*, 1995, pp. 345-353, vol. 40(3).

Chen, S-L., et al., "Photo-Cross-Linking of Sulfonated Styrene-Ethylene-Butylene Copolymer Membranes for Fuel Cells," *Ind. Eng. Chem. Res.*, 2005, pp. 7701-7705, vol. 44.

Chen, J., et al., "Preparation of Sulfonated Crosslinked PTFE-*graft*-poly(alkyl vinyl ether) Membranes for Polymer Electroltye Membrane Fuel Cells by Radiation Processing," *Journal of Membrane Science*, 2005, pp. 38-45, vol. 256.

Si, Y., et al., "Trilayer Membranes With a Methanol-Barrier Layer for DMFCs," *Journal of the Electrochemical Society*, 2004, pp. A463-A469, vol. 151(3).

Whittingham, S., et al., "Introduction: Batteries and Fuel Cells," *Chemical Reviews*, 2004, pp. 4243-4244, vol. 104(10).

Bae et al. Nafion®-graft-polystyrene sulfonic acid membranes for direct methanol fuel cells. *Journal of Membrane Science*, vol. 276, (2006), pp. 51-58.

Buchi et al. Study of radiation-grafted FEP-g-Polystyrene membranes as polymer electrolytes in fuel cells. *Electrochimica Acra*, vol. 40, No. 3, (1995), pp. 345-353.

Chen et al. Photo-cross-linking of sulfonated styrene-ethylene-butylene copolymer membranes for fuel cells. *Industrial and Engineering Chemistry Research*, vol. 44, (2005), pp. 7701-7705.

Chen et al. Preparation of sulfonated crosslinked PRFE-graft-poly(alkyl vinyl ether) membranes for polymer electrolyte membrane fuel cells by radiation processing. *Journal of Membrane Science*, vol. 256, (2005), pp. 38-45.

Gil et al. Direct synthesis of sulfonated aromatic poly(ether ether ketone) proton exchange membranes for fuel cell applications. *Journal of Membrane Science*, vol. vol. 234, (2004), pp. 75-81.

Hickner et al. Alternative polymer systems for proton exchange membranes (PEMs). *Chemical Review*, vol. 104, No. 10, (2004), pp. 4587-4612.

Kang et al. Highly charged proton exchange membranes prepared by using water soluble polymer blends for fuel cells. *Journal of Membrane Science*, vol. 247, (2005), pp. 127-135.

Kerres et al. Development and characterization of crosslinked ionomer membranes based upon sulfinated and sulfonated PSU Crosslinked PSU blend membranes by disproportionation of sulfinic acid groups. *Journal of Membrane Science*, vol. 139, (1998), pp. 211-225.

Kerres et al. Development and characterization of crosslinked ionomer membranes based upon sulfinated and sulfonated PSU Crosslinked PSU blend membranes by alkylation of sulfinate groups with dihalogenoalkanes. *Journal of Membrane Science*, vol. 139, (1998), pp. 227-241.

Si et al. Nafion-teflon-Zr(HPO4)2 composite membranes for high-temperature PEMFCs. *Journal of the Electrochemical Society*, vol. 151, No. 4, (2004), pp. A623-A631.

Si et al. Trilayer membranes with a methanol-barrier layer for DMFCs. *Journal of the Electrochemical Society*, vol. 151, No. 3, (2004), pp. A463-A469.

Vie et al. Fuel cell performance of proton irradiated and subsequently sulfonated poly(vinyl fluoride) membranes. *Journal of Membrane Science*, vol. 204, (2002), pp. 295-301.

Whittingham et al. Introduction: batteries and fuel cells. *Chemical Reviews*, vol. 104, No. 10, (2004), pp. 4243-4244.

Won et al. Fixation of nanosized proton transport channels in membranes. *Macromolecules*, vol. 36, (2003), pp. 3228-3234.

Yang et al. Copolymerizaton of ethylene, tetrafluoroethylene, and an olefin-containing fluorosulfonyl fluoride: synthesis of high-proton-conductive membranes for fuel-cell applications. *Angewandte Chemie International Edition*, vol. 44, (2005), pp. 564-567.

Zhou et al. Molded, high surface area polymer electrolyte membranes from cured liquid precursors. *Journal of American Chemical Society*, vol. 128, (2006), pp. 12963-12972.

Malhotra et al. Membrane-supported nonvolatile acidic electrolytes allow higher temperature operation of proton-exchange membrane fuel cells. *Journal of Electrochemical Society*, vol. 144, No. 2, (1997), pp. L23-L26.

Mikhailenko et al. Proton conducting membranes based on cross-linked sulfonated poly(ether ether ketone) (SPEEK). *Journal of Membrane Science*, vol. 233, (2004), pp. 93-99.

Qiao et al. Chemically modified Poly(vinyl alcohol)-Poly(2-acrylamido-2-methyl-1-propanesulfonic acid) as a novel proton-conducting fuel cell membrane. *Chemistry of Materials*, vol. 17, (2005), pp. 2413-2421.

Qiao et al. New highly proton-conducting membrane poly(vinylpyrolidone)(PVP) modified poly(vinyl alcohol)/2-acrylamido-2-methyl-1-propanesulfonic acid (PVA-PAMPS) for low temperature direct methanol fuel cells (DMFCs). *Polymer*, vol. 46, (2005), pp. 10809-10816.

Rhim et al. Crosslinked poly(vinyl alcohol) membranes containing sulfonic acid group: proton and methanol transport through membranes. *Journal of Membrane Science*, vol. 238, (2004), pp. 143-151.

Schmeisser et al. Photocuring and photolithography of proton-conducting polymers bearing weak and strong acids. *Chemistry of Materials*, vol. 17, (2005), pp. 387-394.

Schmidt et al. Influence of Cross-linking on performance of radiation-grafted and sulfonated FEP 25 membranes in H2-O2 PEFC. *Journal of the Electrochemical Society*, vol. 152, No. 1, (2005), pp. A93-A97.

* cited by examiner

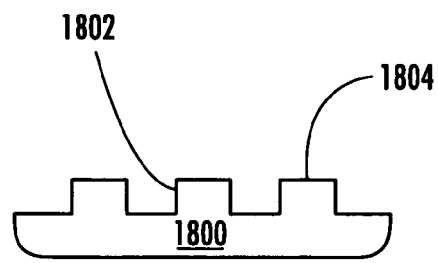
FIG. 18A
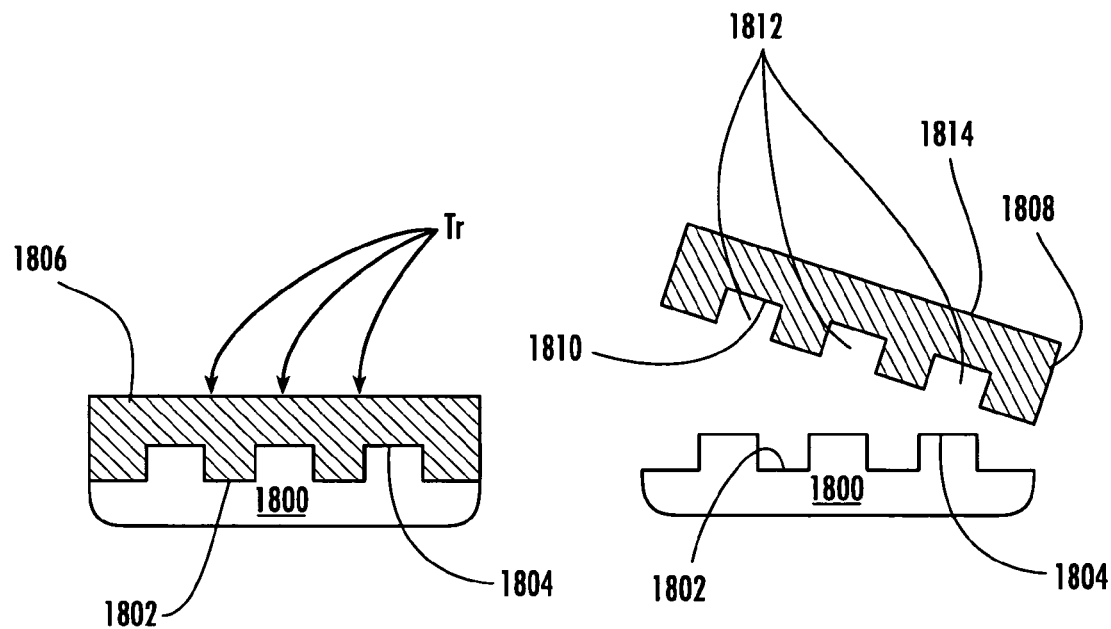
FIG. 18B
FIG. 18C

LIQUID MATERIALS FOR USE IN ELECTROCHEMICAL CELLS

CROSS REFERENCE TO RELATED APPLICATIONS

This application is based on and claims priority to U.S. Provisional Patent Application Ser. No. 60/538,706, filed Jan. 23, 2004, and U.S. Provisional Patent Application Ser. No. 60/538,878, filed Jan. 23, 2004, both of which are incorporated herein by reference in their entirety.

GOVERNMENT INTEREST

This invention was made with U.S. Government support from the Office of Naval Research Grant No. N00014210185 and the Science and Technology Center program of the National Science Foundation under Agreement No. CHE-9876674. The U.S. Government has certain rights in the invention.

TECHNICAL FIELD

The presently disclosed subject matter relates to liquid materials for use in electrochemical cells.

ABBREVIATIONS

| | |
|---|---|
| AC = | alternating current |
| Ar = | Argon |
| °C. = | degrees Celsius |
| cm = | centimeter |
| CSM = | cure site monomer |
| g = | grams |
| h = | hours |
| HMDS = | hexamethyldisilazane |
| IL = | imprint lithography |
| MCP = | microcontact printing |
| Me = | methyl |
| MEA = | membrane electrode assembly |
| MEMS = | micro-electro-mechanical system |
| MeOH = | methanol |
| MIMIC = | micro-molding in capillaries |
| mL = | milliliters |
| mm = | millimeters |
| mmol = | millimoles |
| $M_n$ = | number-average molar mass |
| m.p. = | melting point |
| mW = | milliwatts |
| NCM = | nano-contact molding |
| NIL | nanoimprint lithography |
| nm = | nanometers |
| Pd = | palladium |
| PDMS = | polydimethylsiloxane |
| PEM = | proton exchange membrane |
| PFPE = | perfluoropolyether |
| PSEPVE = | perfluoro-2-(2-fluorosulfonylethoxy)propyl vinyl ether |
| PTFE = | polytetrafluoroethylene |
| SAMIM = | solvent-assisted micro-molding |
| SEM = | scanning electron microscopy |
| Si = | silicon |
| TFE = | tetrafluoroethylene |
| μm = | micrometers |
| UV = | ultraviolet |
| W = | watts |
| ZDOL = | poly(tetrafluoroethylene oxide-co-difluoromethylene oxide)α,ω diol |

BACKGROUND

Fuel cells are a safe, environmentally friendly source of electric energy for portable devices, vehicles (including hybrid vehicles), generators, and aerospace and military applications. The current technology of fuel cells, however, has not made a significant impact on the mainstream market due to cost, size, and the lack of an immediate need to replace current power sources, such as batteries and gasoline- or diesel-powered internal combustion engines. The long-term need to find alternative power sources has become increasingly evident, however. For example, the byproducts of gasoline- and diesel-powered internal combustion engines are environmentally harmful. In contrast, the byproducts of fuel cells are clean, and in some cases, comprise only water.

Further, with portable electronic devices, such as cell phones, laptops, and handheld personal organizers becoming smaller, the need for smaller power sources, such as micro fuel cells, becomes evident. Present fuel cell technology, however, typically requires large fuel cell stacks comprising high-cost flat proton exchange membranes (PEMs).

Additionally, consumer products require power sources that operate for an extended period of time without the need for recharging. Micro fuel cells typically provide a longer lasting energy output with one cartridge of fuel. For example, the chemical fuels used in micro fuel cells promise to power devices up to ten times as long as batteries on a single charge. Further, once the energy source becomes low, the energy level can be restored by merely replacing the fuel cartridge.

Most fuel cells employ a copolymer of tetrafluoroethylene (TFE) and a perfluorinated monomer comprising sulfonic acid groups, such as perfluorosulfonyl fluoride ethoxy propyl vinyl ether (PSEPVE). One such copolymer is available as NAFION® (E. I. duPont de Nemours and Co., Wilmington, Del., United States of America), or a similar commercially available material. These materials often are provided as a membrane in final form, e.g., a non-thermoplastic form having a flat rectangular or square geometry, for subsequent use. If the membrane is flat and smooth, i.e., non-patterned, the catalyst layer also must be flat. Further, such membranes typically must be of at least a certain minimum thickness to be handleable. Additionally, the power density or conductivity is usually directly proportional to the membrane thickness; that is, the thicker the membrane, the lower the power density.

Additionally, Lu et al., *Electrochimica Acta*, 49, 821-828 (2003) have described silicon-based materials for use in a micro direct methanol fuel cell. Silicon-based micro direct fuel cells are rigid, brittle devices that typically are expensive and time consuming to manufacture. Also, incorporating actuating valves in silicon-based materials is difficult or impossible due to the rigid nature of the material. Further, the silicon-based micro direct methanol fuel cell described by Lu et al. has a ratio of active area versus macroscopic area equal to about one.

Also, in currently available fuel cell technologies it is imperative to have good contact between the electrode, proton exchange membrane (PEM), and catalyst. High power densities rely on conformal contact between the electrode, the catalyst, and the PEM. Much research has been invested in developing new PEMs and new catalysts, but little has been investigated in terms of a new catalyst ink composition. Conventional catalyst inks or tie layers typically consist of a catalyst such as platinum, an electrode material such as carbon black, and a dispersion of NAFION®, water, and alcohol.

Further, PEMs currently available in the art consist of one equivalent weight (EW), which gives rise to a trade-off between power density and methanol permeability.

Thus, there is a need in the art for an improved electrochemical cell, in particular a micro fuel cell that is capable of providing power to small, portable electronic devices, as well as a need for improved electrochemical cell components.

SUMMARY

The presently disclosed subject matter describes liquid materials for use in an electrochemical cell, such a fuel cell, a chlor-alkali cell, a battery, and the like. Accordingly, in some embodiments, the presently disclosed subject matter provides a composition for a polymeric electrolyte and a method for preparing a polymeric electrolyte. In some embodiments, the method comprises: (a) providing a 100% solids liquid precursor material, wherein the 100% solids liquid precursor material comprises from about 70% by weight to about 100% by weight of polymerizable materials and (b) treating the liquid precursor material to form a polymeric electrolyte.

In some embodiments, the 100% solids liquid precursor material comprises a material selected from the group consisting of a proton conductive material, a precursor to a proton conductive material, and combinations thereof. In some embodiments, the 100% solids liquid precursor material comprises a material selected from the group consisting of a monomer, an oligomer, a macromonomer, an ionomer, and combinations thereof. In some embodiments, at least one of the monomer, the oligomer, the macromonomer, and the ionomer comprises a functionalized perfluoropolyether (PFPE) material.

In some embodiments, the functionalized perfluoropolyether (PFPE) material comprises a backbone structure selected from the group consisting of:

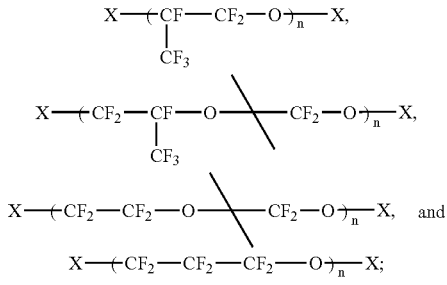

wherein X is present or absent, and when present comprises an endcapping group, and n is an integer from 1 to 100. Thus, in some embodiments, the functionalized PFPE material is selected from the group consisting of:

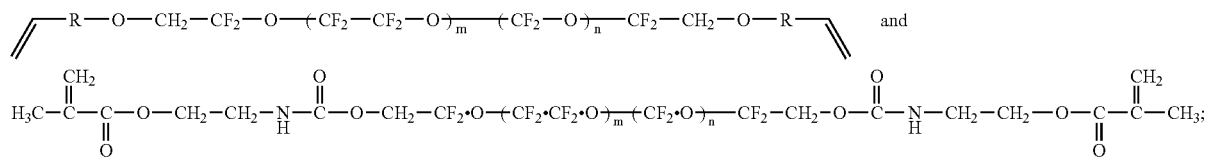

wherein R is selected from the group consisting of alkyl, substituted alkyl, aryl, and substituted aryl; and wherein m and n are each independently integers from 1 to 100.

In some embodiments, the ionomer is selected from the group consisting of a sulfonic acid material and a phosphoric acid material. In some embodiments, the sulfonic acid material comprises a derivative of a sulfonic acid material. In some embodiments, the derivative of a sulfonic acid material comprises a material comprising a perfluoro-2-(2-fluorosulfonylethoxy)propyl vinyl ether (PSEPVE) of the following formula:

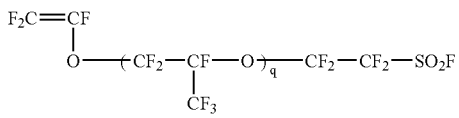

wherein q is an integer from 1 to 5.

In some embodiments, the derivative of a sulfonic acid material comprises a material selected from the group consisting of:

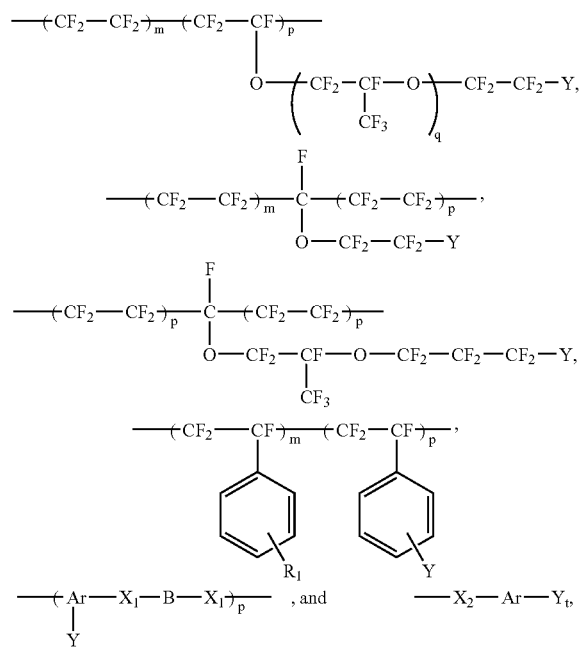

wherein:

Y is selected from the group consisting of —SO$_2$F and —SO$_3$H;

R$_1$ is selected from the group consisting of alkyl, substituted alkyl, hydroxyl, alkoxyl; fluoroalkenyl, cyano, and nitro;

X$_1$ is selected from the group consisting of a bond, O, S, SO, SO$_2$, CO, NR$_2$, and R$_3$;

X$_2$ is selected from the group consisting of O, S, and NR$_2$;

wherein:

R$_2$ is selected from the group consisting of hydrogen, alkyl, substituted alkyl, aryl, and substituted aryl; and R₃ is selected from the group consisting of alkylene, substituted alkylene, aryl, and unsubstituted aryl;

Ar is selected from the group consisting of aryl and substituted aryl;

B is 1,2-perfluorocyclobutylene;

t is an integer from 1 to 3;

m is an integer from 0 to 1000;

p is an integer from 1 to 1000; and q is an integer from 1 to 5.

Thus, in some embodiments, the presently disclosed subject matter provides a polymeric electrolyte comprising a 100% solids liquid precursor material, wherein the 100% solids liquid precursor material comprises from about 70% by weight to about 100% by weight polymerizable materials.

In some embodiments, the presently disclosed subject matter provides a method for preparing a patterned polymeric electrolyte, the method comprising:

(a) contacting a liquid precursor material with a patterned substrate, wherein the patterned substrate comprises a predetermined geometry and a macroscopic surface area; and (b) treating the liquid precursor material to form a patterned polymeric electrolyte.

In some embodiments, the liquid precursor material comprises a material selected from the group consisting of a proton conducting material, a precursor to a proton conducting material, and combinations thereof. In some embodiments, the patterned polymeric electrolyte has a surface area greater than the macroscopic surface area of the patterned substrate.

In some embodiments, the presently disclosed subject matter provides a method for preparing a polymeric electrolyte comprising a plurality of equivalent weights, the method comprising:

(a) applying a first liquid precursor material having a first equivalent weight to a substrate;

(b) treating the first liquid precursor material to form a first layer of treated liquid precursor material on the substrate;

(c) applying a second liquid precursor material having a second equivalent weight to the first layer of treated liquid precursor material on the substrate; and (d) treating the second liquid precursor material to form to form a polymeric electrolyte comprising a plurality of equivalent weights.

In some embodiments, the method comprises repeating steps (c) through (d) with a predetermined plurality of liquid precursor materials comprising a plurality of equivalent weights to form a polymeric electrolyte comprising a plurality of equivalent weights.

In some embodiments, the first liquid precursor material, the second liquid precursor material, and the plurality of liquid precursor materials are selected from the group consisting of a proton conducting material, a precursor to a proton conducting material, and combinations thereof. In some embodiments, the first equivalent weight is greater than the second equivalent weight. In some embodiments, the second equivalent weight is greater than the plurality of equivalents weights. Thus, a gradient of equivalent weights is provided along the cross section of the polymeric electrolyte.

The presently disclosed subject matter also provides a method for forming a membrane electrode assembly (MEA). In some embodiments, the method for forming a membrane electrode assembly (MEA) comprises:

(a) providing a patterned proton exchange membrane;

(b) providing a first catalyst material and a second catalyst material;

(c) providing a first electrode material and a second electrode material; and (d) operationally positioning the proton exchange membrane, the first and the second catalyst material, and the first and the second electrode material in conductive communication to form a membrane electrode assembly.

In some embodiments, at least one of the first catalyst material and the second catalyst material comprises a processible catalyst ink composition. In some embodiments, the processible catalyst ink composition comprises a liquid precursor material. In some embodiments, the processible catalyst ink composition is conformally applied to either or both of a proton exchange membrane and an electrode material.

In some embodiments, the presently disclosed method for forming a membrane electrode assembly comprises:

(a) providing a first electrode material;

(b) providing a second electrode material;

(c) positioning the first electrode material and the second electrode material in a spatial arrangement such that a gap is formed between the first electrode material and the second electrode material;

(d) deposing a liquid precursor material in the gap between the first electrode material and the second electrode material; and (e) treating the liquid precursor material to form a membrane electrode assembly.

In some embodiments, the liquid precursor material is selected from the group consisting of a proton conducting material, a precursor to a proton conducting material, and combinations thereof.

The presently disclosed subject matter also provides a method for forming an electrochemical cell. In some embodiments, the method comprises:

(a) providing at least one layer of a perfluoropolyether (PFPE) material comprising at least one microfluidic channel;

(b) providing a first electrode material and a second electrode material, (c) providing a first catalyst material and a second catalyst material;

(d) providing a proton exchange membrane; and (e) operationally positioning the at least one layer of a PFPE material, the first electrode material, the second electrode material, the first catalyst material, the second catalyst material, and the proton exchange membrane to form the electrochemical cell.

Further, in some embodiments, the presently disclosed subject matter provides a method for operating an electrochemical cell. Accordingly, the presently disclosed electrochemical cells can be used to operate portable electronic devices, such as but not limited to a portable electrical generator, a portable appliance, a power tool, an electronic device, such as a consumer electronic device and a military electronic device, a roadway or traffic sign, a backup power supply, and a personal vehicle, such as an automobile.

Accordingly, it is an object of the presently disclosed subject matter to provide a novel liquid material for use in electrochemical cells. This and other objects are achieved in whole or in part by the presently disclosed subject matter.

An object of the presently disclosed subject matter having been stated hereinabove, other aspects and objects will become evident as the description proceeds when taken in connection with the accompanying Drawings and Examples as best described herein below.

BRIEF DESCRIPTION OF THE DRAWINGS

FIG. 1A is a schematic diagram of a peg mold that can be interdigitated and can be used as a mold, e.g., a patterned substrate, for forming a patterned proton exchange membrane of the presently disclosed subject matter.

FIG. 1B is a schematic representation of a proton exchange membrane prepared from the interdigitated peg mold provided in FIG. 1A.

FIG. 2A is a scanning electron micrograph of the presently disclosed PEM comprising a shark-skin pattern before hydrolysis.

FIG. 2B is a scanning electron micrograph of the presently disclosed PEM comprising a shark-skin pattern after hydrolysis.

FIG. 10A is a schematic representation of an embodiment of the presently disclosed method for forming a catalyst ink tie layer on a planar electrode material.

FIG. 10B is a schematic representation of an embodiment of the presently disclosed method for forming a catalyst ink tie layer on a patterned proton exchange membrane.

FIG. 11A is a schematic representation of an embodiment of the presently disclosed method for conformally coating a patterned PEM with a processible catalyst ink composition followed by coating with an electrode material to form a planarized surface of electrode material.

FIG. 11B is a schematic representation of an embodiment of the presently disclosed method for conformally coating a patterned PEM with a processible catalyst ink composition followed by conformally coating with an electrode material to form a conformal surface of electrode material.

FIG. 11C is a schematic representation of an embodiment of the presently disclosed method for conformally coating a patterned PEM with a processible catalyst ink composition to form a planarized surface of the processible catalyst ink composition followed by conformally coating with an electrode material to form a planarized surface of electrode material.

FIG. 14A is a schematic representation of an embodiment of a presently disclosed three dimensional membrane electrode assembly (MEA) with conformal catalyst loading prepared from a three dimensional proton exchange membrane (PEM).

FIG. 14B is a schematic representation of an embodiment of a presently disclosed two dimensional electrode with non-conformal catalyst loading.

FIG. 17A is a cross-sectional view of an embodiment of the presently disclosed fuel cell.

FIG. 17B is a plan view of an embodiment of the presently disclosed fuel cell.

FIGS. 18A-18C are a series of schematic end views depicting the formation of a patterned layer of perfluoropolyether (PFPE) material comprising microfluidic channels in accordance with the presently disclosed subject matter.

DETAILED DESCRIPTION

Figure 1A:
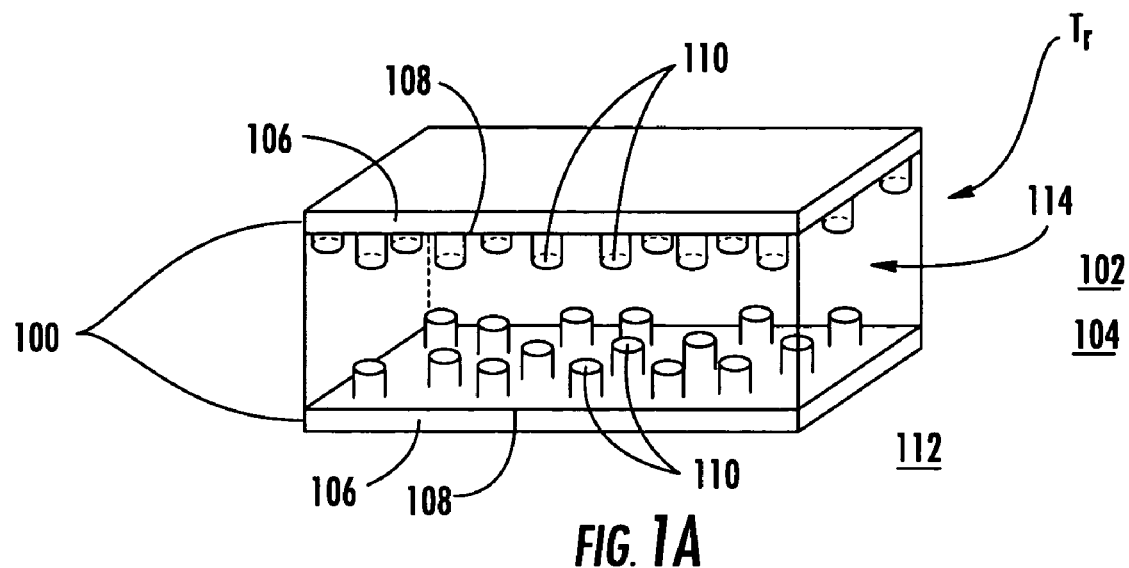
FIGS. 1A and 1B provide a schematic representation of an embodiment of the presently disclosed method for preparing a proton exchange membrane.

The presently disclosed subject matter describes the use of liquid materials in electrochemical cells, such as fuel cells, chlor-alkali cells, and batteries. Accordingly, the presently disclosed subject matter describes liquid materials for preparing a polymeric electrolyte, such as a proton exchange membrane, for use in an electrochemical cell, including proton exchange membranes comprising a gradient of equivalent weights. The presently disclosed subject matter also describes improved electrochemical cell technologies incorporating patterned membranes and electrodes. Further, the presently disclosed subject matter describes liquid materials for preparing a membrane electrode assembly in which an enhanced conformal contact between the electrochemical cell components is demonstrated. Thus, the presently disclosed subject matter also describes liquid materials for preparing processible liquid catalyst ink compositions for use in electrochemical cells. Additionally, the presently disclosed subject matter describes a photocurable perfluoropolyether for fabricating a microfluidic device for use in electrochemical cells, such as micro direct methanol and hydrogen fuel cells.

The presently disclosed subject matter also describes a method for operating an electrochemical cell.

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Liquid Precursor Materials

The presently disclosed subject matter describes liquid, pourable precursor materials that are processible, i.e., can be formed into different shapes or can conform to different shapes, and can be used to prepare a high surface area PEM. In some embodiments, as provided in more detail herein below, the liquid precursor materials can be patterned by a patterned substrate, e.g., a mold, and treated (such as but not limited to cured into solids) to form a patterned PEM.

As used herein, the term "100% solids liquid precursor material" refers to a liquid polymeric precursor material in which essentially all of the components are polymerized when treated, e.g., cured. Thus, in some embodiments, a "100% solids liquid precursor material" is essentially free of non-polymerizable materials. This property of a "100% solids liquid precursor material" distinguishes this material from a solution or dispersion of a liquid precursor material known in the art, in which the liquid material can comprise between about 80% by weight to about 98% by weight of solvent or other non-polymerizable material. For example, one perfluorinated liquid composition commonly used in the art to prepare ion exchange membranes comprises from about 2% by weight to about 18% by weight of the polymeric material and about 82% by weight to about 98% by weight of solvent, which is non-polymerizable. See U.S. Pat. No. 4,433,082 to Grot, which is incorporated herein by reference in its entirety.

Accordingly, in some embodiments, the 100% solids liquid material comprises from about 70% by weight to about 75% by weight of polymerizable material. In some embodiments, the 100% solids liquid material comprises from about 75% by weight to about 80% by weight of polymerizable material. In some embodiments, the 100% solids liquid material comprises from about 80% by weight to about 85% by weight of polymerizable material. In some embodiments, the 100% solids liquid material comprises from about 85% by weight to about 90% by weight of polymerizable material. In some embodiments, the 100% solids liquid material comprises from about 90% by weight to about 95% by weight of polymerizable material. In some embodiments, the 100% solids liquid material comprises from about 95% by weight to about 98% by weight of polymerizable material. In some embodiments, the 100% solids liquid material comprises from about 98% by weight to about 100% by weight of polymerizable material. Thus, in some embodiments, the 100% solids liquid material comprises from about 70% by weight to about 100% by weight of polymerizable material.

Further, in some embodiments, the liquid precursor material comprises a fluorinated system. In some embodiments, the fluorinated system comprises a perfluoropolyether (PFPE) material. In some embodiments, the PFPE material comprises a vinyl-functionalized material, including, but not limited to, a vinyl methacrylate.

In some embodiments, the liquid precursor material comprises species, including vinyl acids, such as perfluoro-2-(2-fluorosulfonylethoxy) propyl vinyl ether (PSEPVE), that enhance proton conductivity. As used herein, the term "proton conductive material" refers to a material within which a proton can be transported. For example, in some embodiments, a proton is transported from an anode through a proton conductive material to a cathode. Proton conductivity can be measured, for example, by alternating current (AC) impedance methods known in the art, and is typically reported in units of Siemens/cm (S/cm). Such proton conductive materials typically have a proton conductivity of greater than about 0.01 S/cm.

In some embodiments, the liquid precursor material comprises other species that regulate the physical properties of the material, including modulus, permeability of methanol and other liquids, wetting, tensile strength, toughness, flexibility, and thermal properties, among others. For exemplary synthesis methods for preparing the liquid precursor materials disclosed herein see Examples 1-6.

Thus, in some embodiments, the method for preparing a polymeric electrolyte comprises:

(a) providing a 100% solids liquid precursor material, wherein the 100% solids liquid precursor comprises from about 70% by weight to about 100% by weight polymerizable materials; and (b) treating the 100% solids liquid precursor material to form a polymeric electrolyte.

In some embodiments, the 100% solids liquid precursor material comprises a material selected from the group consisting of a proton conductive material, a precursor to a proton conductive material, and combinations thereof.

In some embodiments, the 100% solids liquid precursor material comprises a material selected from the group consisting of a monomer, an oligomer, a macromonomer, an ionomer, and combinations thereof.

As used herein, the term "monomer" refers to a molecule that can undergo polymerization, thereby contributing constitutional units, i.e., an atom, a group of atoms, and/or groups of atoms, to the essential structure of a macromolecule or polymer. The term "oligomer" refers to a molecule of intermediate relative molecular mass, the structure of which comprises a small plurality of constitutional units derived from molecules of lower relative molecular mass. The term "macromonomer" refers to a macromolecule or polymer that comprises a reactive end group which enables the macromonomer to act as a monomer and contribute a monomeric unit to a chain of the final macromolecule or polymer. The term "ionomer" refers to a macromolecule in which a plurality of the constitutional units comprise ionizable groups, ionic groups, and combinations thereof.

In some embodiments, at least one of the monomer, the oligomer, the macromonomer, and the ionomer comprises a functionalized perfluoropolyether (PFPE) material. In some embodiments, the functionalized perfluoropolyether (PFPE) material comprises a backbone structure selected from the group consisting of:

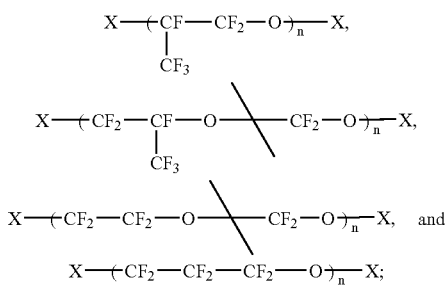

wherein X is present or absent, and when present comprises an endcapping group, and n is an integer from 1 to 100.

In some embodiments, the functionalized PFPE material is selected from the group consisting of:

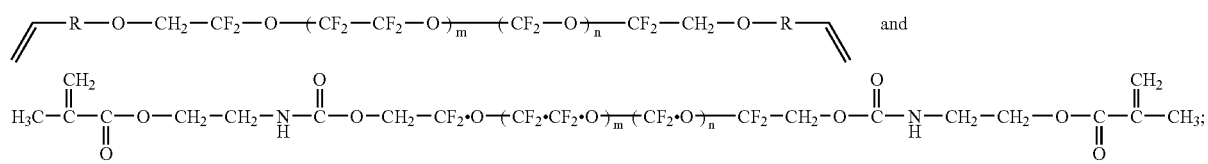

wherein R is selected from the group consisting of alkyl, substituted alkyl, aryl, and substituted aryl; and wherein m and n are each independently integers from 1 to 100.

In some embodiments, the functionalized PFPE material has the following structure:

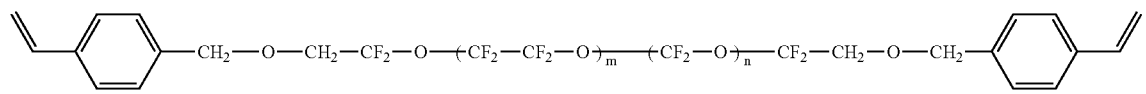

In some embodiments, the ionomer is selected from the group consisting of a sulfonic acid material and a phosphoric acid material. In some embodiments, the ionomer comprises sulfonic acid groups, derivatives of sulfonic acid groups, carboxylic acid groups, derivatives of carboxylic acid groups, phosphonic acid groups, derivatives of phosphonic acid groups, phosphoric acid groups, derivatives of phosphoric acid groups, and/or combinations thereof.

In some embodiments, the sulfonic acid material comprises a derivative of a sulfonic acid material. In some embodiments, the sulfonic acid material comprises a material comprising a perfluoro-2-(2-fluorosulfonylethoxy)propyl vinyl ether (PSEPVE) of the following formula:

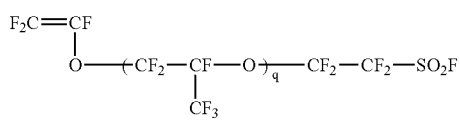

wherein q is an integer from 1 to 5.

In some embodiments, the derivative of a sulfonic acid material comprises a material selected from the group consisting of:

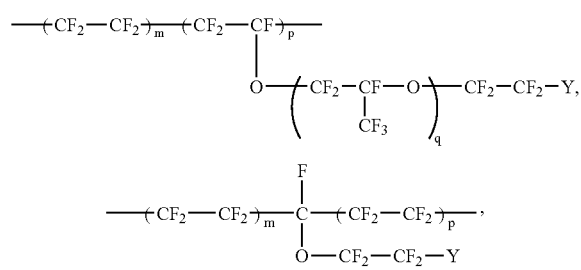

-continued $$\text{—}(\text{CF}_2\text{—}\text{CF}_2)_p\text{—}\overset{\overset{\displaystyle F}{|}}{\underset{\underset{\displaystyle O\text{—}\text{CF}_2\text{—}\text{CF}\text{—}O\text{—}\text{CF}_2\text{—}\text{CF}_2\text{—}\text{CF}_2\text{—}Y,}{|}}{C}}(\text{CF}_2\text{—}\text{CF}_2)_p\text{—}$$

$$\underset{CF_3}{}$$

—(CF$_2$—CF)$_m$—(CF$_2$—CF)$_p$—, with pendant phenyl rings bearing R$_1$ and Y —(Ar—X$_1$—B—X$_1$)$_p$—, and —X$_2$—Ar—Y$_t$,
    |
    Y wherein:
  Y is selected from the group consisting of —SO$_2$F and —SO$_3$H;
  R$_1$ is selected from the group consisting of alkyl, substituted alkyl, hydroxyl, alkoxyl; fluoroalkenyl, cyano, and nitro;

$X_1$ is selected from the group consisting of a bond, O, S, SO, $SO_2$, CO, $NR_2$, and $R_3$;

$X_2$ is selected from the group consisting of O, S, and $NR_2$, wherein:

$R_2$ is selected from the group consisting of hydrogen, alkyl, substituted alkyl, aryl, and substituted aryl; and $R_3$ is selected from the group consisting of alkylene, substituted alkylene, aryl, and unsubstituted aryl;

Ar is selected from the group consisting of aryl and substituted aryl;

B is 1,2-perfluorocyclobutylene;

t is an integer from 1 to 3;

m is an integer from 0 to 1000;

p is an integer from 1 to 1000; and q is an integer from 1 to 5.

In some embodiments, Y is —$SO_2F$. In some embodiments, Y is —$SO_3H$.

Accordingly, in some embodiments, the ionomer can comprise a commercially available acidic material, such as NAFION® (E. I. duPont de Nemours and Co., Wilmington, Del., United States of America) or a similar material, including, but not limited to XUS® (Dow Chemical Company, Midland, Mich., United States of America), ACIPLEX® (Asahi Chemical Industry Co., Tokyo, Japan), BAM3G® (Ballard Advanced Materials, Burnaby, British Columbia, Canada), or acid functionalized perfluorocyclobutane polymers as described in U.S. Pat. No. 6,559,237 to Mao et al. and acid functionalized fluoropolymers as described in U.S. Pat. No. 6,833,412 to Hamrock et al., each of which is incorporated herein by reference in its entirety.

As used herein the term "alkyl" refers to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted with one or more alkyl group substituents, which can be the same or different. The term "alkyl group substituent" includes but is not limited to alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

"Cyclic" and "cycloalkyl" refer to a non-aromatic mono- or multicyclic ring system of about 3 to about 10 carbon atoms, e.g., 3, 4, 5, 6, 7, 8, 9, or 10 carbon atoms. The cycloalkyl group can be optionally partially unsaturated. The cycloalkyl group can be also optionally substituted with an alkyl group substituent as defined herein, oxo, and/or alkylene. There can be optionally inserted along the cyclic alkyl chain one or more oxygen, sulfur or substituted or unsubstituted nitrogen atoms, wherein the nitrogen substituent is hydrogen, lower alkyl, or aryl, thus providing a heterocyclic group. Representative monocyclic cycloalkyl rings include cyclopentyl, cyclohexyl, and cycloheptyl. Multicyclic cycloalkyl rings include adamantyl, octahydronaphthyl, decalin, camphor, camphane, and noradamantyl.

"Alkylene" refers to a straight or branched bivalent aliphatic hydrocarbon group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group can be also optionally unsaturated and/or substituted with one or more "alkyl group substituents." There can be optionally inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—$CH_2$—); ethylene (—$CH_2$—$CH_2$—); propylene (—$(CH_2)_3$—); cyclohexylene (—$C_6H_{10}$—); —CH=CH—CH=CH—; —CH=CH—$CH_2$—; —$(CH_2)_q$—N(R)—$(CH_2)_r$—, wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl (—O—$CH_2$—O—); and ethylenedioxyl (—O—$(CH_2)_2$—O—). An alkylene group can have about 2 to about 3 carbon atoms and can further have 6-20 carbons.

The term "aryl" is used herein to refer to an aromatic substituent that can be a single aromatic ring, or multiple aromatic rings that are fused together, linked covalently, or linked to a common group such as a methylene or ethylene moiety. The common linking group also can be a carbonyl as in benzophenone or oxygen as in diphenylether or nitrogen as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted with one or more aryl group substituents which can be the same or different, where "aryl group substituent" includes alkyl, aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", where R' and R" can be each independently hydrogen, alkyl, aryl, and aralkyl.

Specific examples of aryl groups include but are not limited to cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

The term "arylene" refers to a bivalent group derived from a monocyclic aromatic hydrocarbon or a polycyclic aromatic hydrocarbon by removal of a hydrogen atom from two carbon atoms on the aromatic ring(s). Examples of an "arylene" group include, but are not limited to, 1,2-phenylene, 1,3-phenylene, and 1,4-phenylene.

As used herein, the terms "substituted alkyl," "substituted cycloalkyl," "substituted alkylene," "substituted aryl," and "substituted arylene" include alkyl, alkylene, and aryl groups, as defined herein, in which one or more atoms or functional groups of the alkyl, alkylene, aryl or arylene group are replaced with another atom or functional group, including for example, halogen, aryl, alkyl, alkoxyl, hydroxyl, nitro, amino, alkylamino, dialkylamino, sulfate, and mercapto.

"Alkoxyl" or "alkoxyalkyl" refer to an alkyl-O— group wherein alkyl is as previously described. The term "alkoxyl" as used herein can refer to $C_{1-20}$ inclusive, linear, branched, or cyclic, saturated or unsaturated oxo-hydrocarbon chains, including, for example, methoxyl, ethoxyl, propoxyl, isopropoxyl, butoxyl, t-butoxyl, and pentoxyl.

The terms "halo", "halide", or "halogen" as used herein refer to fluoro, chloro, bromo, and iodo groups.

The term "hydroxyl" refers to the —OH group.

The term "hydroxyalkyl" refers to an alkyl group substituted with an —OH group.

The term "nitro" refers to the —$NO_2$ group.

In some embodiments, the treating of the precursor material comprises a process selected from the group consisting of: (a) a curing process; (b) a chemical modification process; (c) a network forming process; and (d) combinations thereof. In some embodiments, the curing process comprises a process selected from the group consisting of a thermal process, a photochemical process, and an irradiation process. In some embodiments, the irradiation process comprises irradiating the liquid precursor material with radiation, wherein the radiation is selected from the group consisting of gamma rays and an electron beam. In some embodiments, the chemical modification process comprises a crosslinking process. Methods for the radiolysis of fluoropolymers, including perfluoropolyether materials, are provided in J. S. Forsvthe, et al., *Prog. Polym. Sci.*, 25, 101-136 (2000), which is incorporated herein by reference in its entirety.

Further, Published PCT International Application WO 99/61141 to Mao et al. describes a method of making crosslinked polymers suitable for use in ion conductive membranes, such as a proton exchange membrane, by (a) crosslinking a polymer having pendant acid halide groups with a crosslinker which bonds to two or more acid halide groups, or (b) crosslinking a polymer having pendant amide groups with a crosslinker which bonds to two or more amide groups. Also, Buchi et al., *J. Electrochem. Soc.*, 142(9), 3004 (1995), discloses proton exchange membranes made by sulfonating a crosslinked polyolefin-polystyrene copolymer, which is crosslinked during polymerization by addition of divinyl benzene. U.S. Pat. No. 5,438,082 to Helmer-Metzmann et al. discloses a method of crosslinking a sulfonated aromatic polyether ketone with a crosslinker comprising an amine functional group. Further, U.S. Pat. No. 5,468,574 to Ehrenberq et al. and Published PCT International Patent Application No. WO 97/19,480 to Graham et al. disclose that certain sulfonated polymers will form direct bonds between sulfonate groups upon heating; however, this method appears to sacrifice sulfonic acid groups thereby resulting in the loss of acidity in the membrane. The above-mentioned patents, publications, and published patent applications are incorporated herein by reference in their entirety.

Thus, in some embodiments, the presently disclosed subject matter provides a polymeric electrolyte comprising a 100% solids liquid precursor material as defined hereinabove, wherein the 100% solids liquid precursor material comprises from about 70% by weight to about 100% by weight polymerizable materials.

In some embodiments, the presently disclosed polymeric electrolyte has an equivalent weight, wherein the equivalent weight is selected from the group consisting of an equivalent weight less than about 1500 and greater than about 1000, an equivalent weight less than about 1000 and greater than about 800, an equivalent weight less than about 800 and greater than about 500, and an equivalent weight below about 500.

Further, in some embodiments, the presently disclosed subject matter provides an electrochemical cell comprising the polymeric electrolyte prepared from a 100% solids liquid precursor. In some embodiments, the electrochemical cell is selected from the group consisting of a fuel cell, a chlor-alkali cell, and a battery.

Further, NAFION® and other PEM materials perform best when relative humidity values are high, for example above about 90%. Incorporation of an alcohol into a NAFION®-like material makes the material more hydrophilic, which can result in good conductivity at lower relative humidities and/or reduced water loss at higher temperatures. An example is provided in Scheme 11, which provides a method for polymerizing components of a NAFION®-like material with vinyl acetate. Simple hydrolysis reactions convert the acetate to the alcohol while obtaining a sulfonic acid group on the proton-conducting compound. Post fluorination on the material can provide chemical and thermal stability of a perfluorinated material.

Another limitation of NAFION® is its low acid content. The acid content of NAFION® can not be much higher than is currently available in commercial grades since increasing the acid content (lowering the equivalent weight) by increasing the fraction of PSEPVE incorporated into the TFE/PSEPVE copolymer leads to molecular weight reduction because of the propensity of fluorinated vinyl ethers to undergo β-scission reactions during polymerization. See Romack, T. J., and DeSimone. J. M., *Macromolecules*, 28, 8429-8431 (1995), which is incorporated by reference in its entirety. Thus, as the acid content of NAFION® is increased, the molecular weight of the polymer decreases and the mechanical properties are compromised. Such a linear, low molecular weight, high acid-containing NAFION®-like material has poor film forming qualities and becomes water soluble, an unacceptable property. This limitation in the reaction chemistry used to make NAFION® limits commercial suppliers to selling grades of NAFION® that do not contain a high enough acid content necessary for very high proton conductivity. Indeed, the most widely studied commercial grade of NAFION® has an equivalent weight of 1100 with a proton conductivity of only 0.083 S/cm at room temperature under fully hydrated conditions. See Mauritz. K. A. and Moore. R. B., *Chem. Rev.*, 104, 4535-4585 (2004), which is incorporated herein by reference in its entirety. The presently disclosed materials address these deficiencies and generate new PEMs that have much higher conductivities, are more thermally stable, more selective, more mechanically robust, and incorporate a modular design that will allow for independent control of membrane properties.

Without being bound to any one particular theory, it is believed that the high conductivity in the presently disclosed materials is due to a fundamentally different proton conduction mechanism than is operative in NAFION®. According to most reports, see, e. g., Mauritz, K. A. and Moore, R. B., *Chem. Rev.*, 104, 45354585 (2004), the morphology of NAFION® can be considered as isolated clusters of acid groups embedded in a Teflon-like matrix. Protons can hop from acid group to acid group within the clusters, but in order for a proton to macroscopically transport across the PEM, it must migrate in the form of a hydronium ion through hydrophilic channels from one acid cluster to the next. That is, in order for NAFION® to be highly proton conductive, the presence of a threshold amount of water is a requirement. This requirement for NAFION® to be hydrated in order for it to be highly proton conductive, see Mauritz, K. A. and Moore. R. B., *Chem. Rev.*, 104, 4535-4585 (2004), presents a real implementation barrier for the use of NAFION®-based fuel cells at temperatures above the boiling point of water. Again, without being bound to any one particular theory, it is believed that the very high acid contents achievable in the presently disclosed liquid precursors to cross-linked PEMs results in a continuum of acid groups that are within proton hopping distances of each other. As such, protons can macroscopically transport through the film without the required water content associated with commercial grades of NAFION® or any other emerging PEM material that has equivalent weights>550.

In sum, the presently disclosed materials can be used in traditional electrochemical cell applications, such as automotive applications, as well as portable power, for example, for electronic devices. In some embodiments, the presently disclosed materials exhibit an improved mechanical stability at elevated temperatures. In some embodiments, the presently disclosed materials exhibit a decreased permeability for alkyl alcohols, such as methanol. In some embodiments, the presently disclosed materials provide an increased electrochemical cell performance at lower relative humidity and an increase in the hydrophilicity of the proton exchange membrane.

II. Method for Preparing a Patterned Proton Exchange Membrane

In some embodiments, the presently disclosed subject matter provides a method for preparing a patterned proton exchange membrane. One such embodiment is provided in FIGS. 1A-1B.

Referring now to FIG. 1A, a patterned substrate, e.g., mold 100, is provided. Mold 100 can comprise a material selected from the group consisting of an inorganic material, an organic material, and combinations thereof. In some embodiments, mold 100 has a predetermined geometry 102, wherein predetermined geometry 102 has a macroscopic area 104. For example, as depicted in FIG. 1A, predetermined geometry 102 comprises a rectangular substrate 106 with a first planar surface 108, wherein first planar surface 108 further comprises a plurality of structural features 110, which are depicted in FIG. 1A as a plurality of pegs extending from first planar surface 108.

Further, as would be appreciated by one of ordinary skill in the art upon a review of the present disclosure, the plurality of structural features 110 can take any form, including but not limited to a peg, a fluted peg, a roll-up cylinder, a pattern, a wall, and an interdigitated surface (not shown). Accordingly, the proton exchange membranes made by the presently disclosed method can be made in various geometries, can have numerous pathways, and/or can comprise a controlled or a variable surface area.

In some embodiments, the proton exchange membranes prepared by the presently disclosed method have a greater "active surface" area compared to "macroscopic surface" area. Thus, in some embodiments, predetermined geometry 102 comprises a plurality of structures 110 having a surface area 112, which is greater than the macroscopic area 104 of mold 100. In some embodiments, the plurality of structures 110 has a surface area 112 ranging from at least about two times to about 100 times the macroscopic surface area 104 of mold 100. In some embodiments, predetermined geometry 102 comprises a plurality of structures 110 having a surface area 112 at least two times greater than the macroscopic surface 104 area of mold 100. In some embodiments, predetermined geometry 102 comprises a plurality of structures 110 having a surface area 112 at least five times greater than the macroscopic surface area 104 of mold 100. In some embodiments, predetermined geometry 102 comprises a plurality of structures 110 having a surface area 112 at least twenty times greater than the macroscopic surface area 104 of mold 100. In some embodiments, predetermined geometry 102 comprises a plurality of structures 110 having a surface area 112 at least eighty times greater than the macroscopic surface area 104 of mold 100.

Figure 1B:
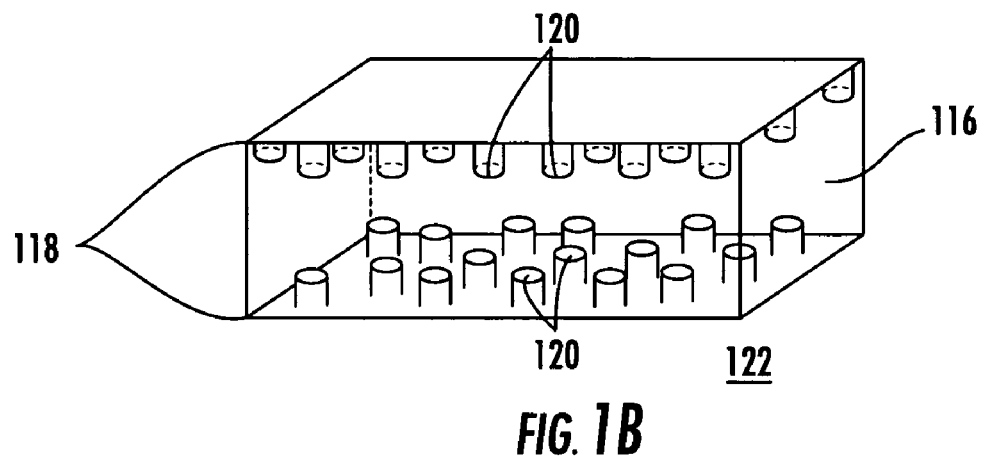

Referring now to FIGS. 1A and 1B, a liquid precursor material 114 is contacted with mold 100. Liquid precursor material 114 can comprise any of the liquid precursor materials disclosed hereinabove, that is liquid precursor material 114 can comprise a proton conducting material, a precursor to a proton conducting material, and combinations thereof. Liquid precursor material 114 is treated by a treating process $T_r$ to form a treated liquid precursor material 116 as depicted in FIG. 1B.

In some embodiments, treating process $T_r$ comprises a process selected from the group consisting of a curing process, a chemical modification process, a network forming process, a solvent evaporation process, and combinations thereof. In some embodiments, the curing process comprises a process selected from the group consisting of a thermal process, a photochemical process, and an irradiation process. Further, in some embodiments, the irradiation process comprises irradiating the liquid material with radiation, wherein the radiation is selected from the group selected from gamma rays and an electron beam. In some embodiments, the chemical modification process comprises a crosslinking process.

Referring now to FIG. 1B, treated liquid precursor material 116 is removed from mold 100 to provide a freestanding proton exchange membrane 118 comprising a plurality of structural features 120, which correspond to the plurality of structural features 110 of mold 100. In some embodiments, the plurality of structures 110 and 120 have a dimension 122 of less than 10 mm. In some embodiments, the plurality of structures 110 and 120 have a dimension 122 of less than 1 mm. In some embodiments, the plurality of structures 110 and 120 have a dimension 122 of less than 100 µm. In some embodiments, the plurality of structures 110 and 120 have a dimension 122 of less than 10 µm. In some embodiments, the plurality of structures 110 and 120 have a dimension 122 of less than 1 µm. Said another way, in some embodiments, the individual structures comprising the plurality of structures 110 and 120 can have a height having a dimension ranging from less than about 10 mm to less than about 1 µm and/or a width having a dimension ranging from less than about 10 mm to less than about 1 µm.

Thus, in some embodiments, the presently disclosed subject matter provides a method for preparing a patterned polymeric electrolyte, the method comprising:
(a) contacting a liquid precursor material with a patterned substrate, wherein the patterned substrate comprises a predetermined geometry and a macroscopic surface area; and
(b) treating the liquid precursor material to form a patterned polymeric electrolyte.

In some embodiments, the liquid precursor material comprises a material selected from the group consisting of a proton conducting material, a precursor to a proton conducting material, and combinations thereof.

In some embodiments, the patterned substrate comprises a material selected from the group consisting of an inorganic material, an organic material, and combinations thereof.

In some embodiments, the predetermined geometry comprises a non-planar geometry. In some embodiments, the non-planar geometry comprises features having a predetermined dimension selected from the group consisting of a dimension less than about 10 mm and greater than about 1 mm, a dimension less than about 1 mm and greater than about 100 µm, a dimension less than about 100 µm and greater than 10 µm, a dimension less than about 10 µm and greater than about 1 µm, and a dimension less than about 1 µm.

In some embodiments, the predetermined geometry is defined by one of a catalyst layer and an electrode material comprising a membrane electrode assembly. In some embodiments, the predetermined geometry is defined by a membrane electrode assembly. In some embodiments, the predetermined geometry comprises a structure selected from the group consisting of a pattern, a peg, a wall, an interdigitated surface, and a roll-up cylinder.

In some embodiments, the predetermined geometry comprises a structure having a surface area greater than the macroscopic surface area of the patterned substrate. In some embodiments, the structure has a surface area ranging from at least about two times to about 100 times the macroscopic surface area of the patterned substrate.

In some embodiments, the treating of the liquid precursor material comprises a process selected from the group consisting of: (a) a curing process; (b) a chemical modification process; (c) a network forming process; (d) a solvent evaporation process; and (e) combinations thereof.

Thus, in some embodiments, the presently disclosed subject matter provides a patterned proton exchange membrane prepared by the presently disclosed method. In some embodiments, the patterned proton exchange membrane comprises a material having an equivalent weight, wherein the equivalent weight is selected from the group consisting of an equivalent weight less than about 1500 and greater than about 1000, an equivalent weight less than about 1000 and greater than about 800, an equivalent weight less than about 800 and greater than about 500, and an equivalent weight below about 500.

In some embodiments, the presently disclosed subject matter provides an electrochemical cell comprising the presently disclosed patterned proton exchange membrane. In some embodiments, the electrochemical cell is selected from the group consisting of a fuel cell, a chlor-alkali cell, and a battery.

Figure 2A:
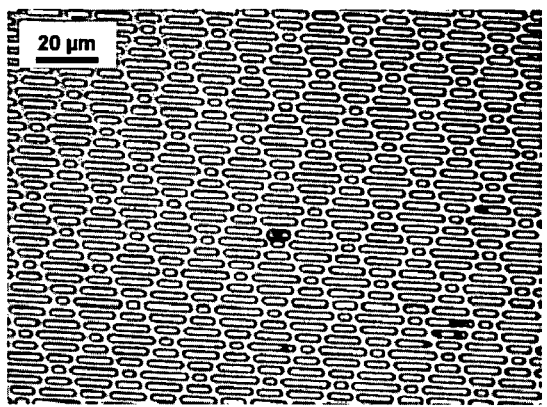
FIGS. 2A and 2B are scanning electron micrographs of a proton exchange membrane (PEM) comprising a shark-skin pattern prepared by the presently disclosed method.
Figure 2B:
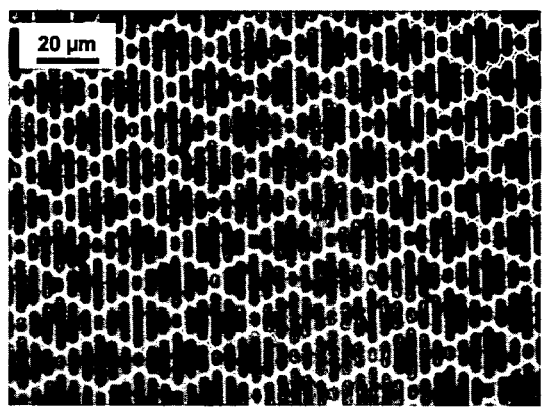

An example of a proton exchange membrane prepared by the presently disclosed method is provided in FIGS. 2A and 2B, which show a scanning electron micrograph of a PEM with a shark-skin pattern before hydrolysis and a scanning electron micrograph of a PEM with a shark-skin pattern after hydrolysis, respectively. The shark-skin pattern was prepared as described in Example 7. The feature size of the shark-skin pattern, i.e., a structure as described immediately hereinabove, in this particular example is about 2 µm in width and about 8 µm in height. By employing the shark-skin patterns, the surface area of the patterned PEM is about five times greater than the surface area of a flat, unpatterned PEM of the same macroscopic dimensions. As indicated by the scanning electron micrograph provided in FIG. 2A, high fidelity structural features are obtained by the presently disclosed method. Further, as shown by the scanning electron micrograph provided in FIG. 2B, the patterns swell after the PEM undergoes hydrolysis, but the structural features are still evident.

In some embodiments, the predetermined geometry of mold 100, e.g., element 102 of FIG. 1A, and thus the geometry of the PEM formed therein, is defined by a catalyst tie layer, as provided in FIG. 10 herein below, and/or an electrode material of a membrane electrode assembly. Further, because the presently disclosed liquid precursor material, e.g., liquid precursor material 114 of FIG. 1A, is a liquid, it is pourable. Thus, liquid precursor material 114 can be poured into existing structures, such as a structure defined by electrode materials.

Figure 3A:
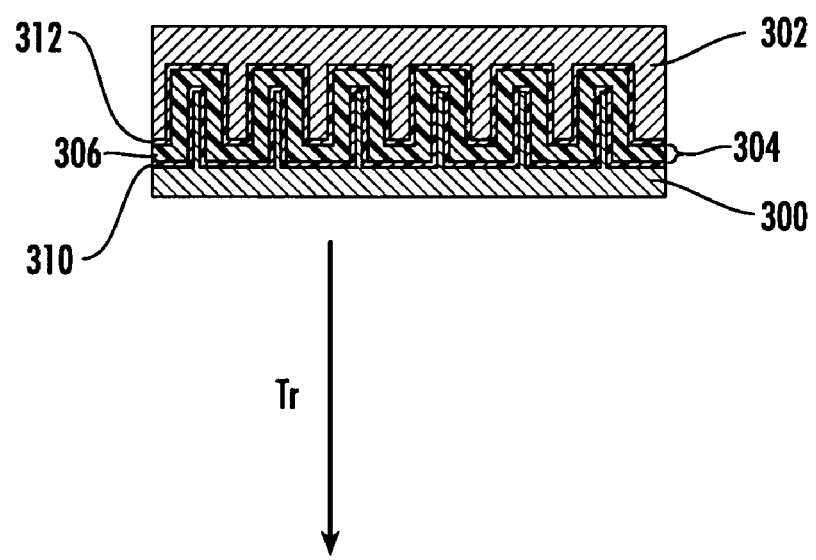
FIGS. 3A and 3B are schematic diagrams of embodiments of the presently disclosed method for using a patterned electrode pair as a mold for forming a proton exchange membrane of the presently disclosed subject matter.
Figure 3B:
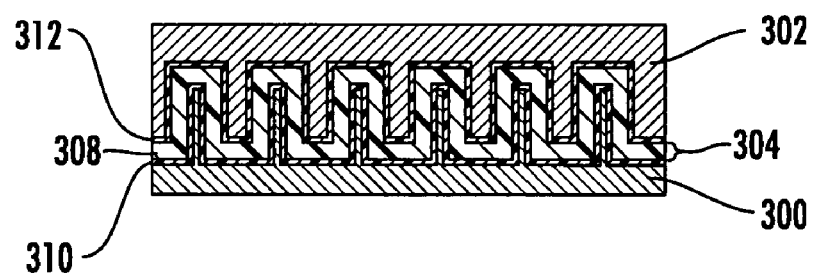

For example, referring now to FIGS. 3A and 3B, a first electrode material 300 and a second electrode material 302 are operationally positioned in a spatial arrangement such that a gap 304 is created therein between. A liquid precursor material 306 is poured into gap 304. Liquid precursor material 306 can comprise any of the liquid precursor materials disclosed hereinabove. Liquid precursor material 306 is then treated by a treating process $T_r$ to form a proton exchange membrane 308, which, in some embodiments, remains in a functional position between first electrode material 300 and second electrode material 302. Thus, in some embodiments, the liquid precursor material, e.g., 306, is infused directly into the preconfigured cavity, e.g., gap 304 formed between first electrode material 300 and second electrode material 302, followed by treating process $T_r$.

Referring once again to FIGS. 3A and 3B, in some embodiments, the first electrode material 300 is coated with a first catalyst material 310 and second electrode material 302 is coated with a second catalyst material 312 before liquid precursor material 306 is poured into gap 304.

In some embodiments, proton exchange membrane 308 comprises a material having an equivalent weight, wherein the equivalent weight is selected from the group consisting of an equivalent weight less than about 1500 and greater than about 1000, an equivalent weight less than about 1000 and greater than about 800, an equivalent weight less than about 800 and greater than about 500, and an equivalent weight below about 500. The conductivities of representative PEMs prepared from the presently disclosed liquid materials having different equivalent weights at fully hydrated conditions are provided in FIGS. 4 through 8.

III. Method for Preparing a Polymeric Electrolyte Comprising a Gradient of Equivalent Weights Further, the synthetic methods of the liquid precursor materials disclosed herein can be varied to produce a gradient of compositions to tailor the properties and to improve the performance of the presently disclosed PEMs. Current PEMs typically comprise materials having one equivalent weight (EW), a property that results in a trade-off between power density and methanol permeability. For example, NAFION®-based high equivalent weight PEMs are less permeable to methanol. Such materials, however, exhibit a relatively low conductivity. Low EW PEMs give higher conductivity values relative to those with higher EW materials of comparable components, but allow for high methanol permeability, which results in a drastic decrease in power density.

The presently disclosed subject matter provides a PEM having a gradient of equivalent weights. With a gradient of EWs as disclosed herein, optimum performance in both areas (methanol permeability and conductivity) can be achieved. For example, the use of a material with a higher EW at the anode provides a PEM with a low methanol permeability, whereas inclusion of materials having a lower EW throughout the cross section of the PEM provides for a higher power density.

Figure 9A:
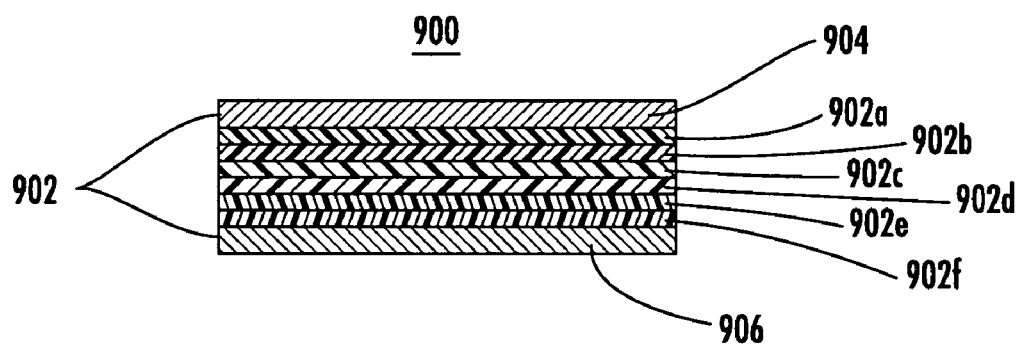
FIGS. 9A and 9B are schematic diagrams of an embodiment of a presently disclosed proton exchange membrane (PEM) comprising liquid materials of varying equivalent weights, which provide a gradient of equivalent weights along the cross section of the PEM.

Referring now to FIG. 9A, the preparation of a proton exchange membrane 900 with a plurality of liquid materials 902 is disclosed. In this embodiment plurality of liquid materials 902 comprise a plurality of liquid materials 902a through 902f. In some embodiments, liquid materials 902a through 902f comprise a high glass transition temperature ($T_g$) NAFION®-like material. Liquid materials 902a through 902f are not restricted to a high $T_g$ material, however, and in some embodiments liquid materials 902a through 902f comprise a fluorinated or perfluorinated elastomer-based material, or any material disclosed herein.

In some embodiments, each liquid material, e.g., 902a, 902b, 902c, 902d, 902e, and 902f, has a different equivalent weight (e.g., $EW_a$, $EW_b$, $EW_c$, $EW_d$, $EW_e$, and $EW_f$, respectively (not shown)). As used herein the term "equivalent weight" refers to the mass of an acidic material that contains one equivalent of acid functional groups. Thus, the equivalent weight of a polymeric electrolyte as disclosed herein is the number of acidic group equivalents in the polymeric electrolyte divided by the weight of the polymeric electrolyte. Further, as used herein, the term "different equivalent weight" refers to an equivalent weight, e.g., $EW_a$ that varies about 50 g/mol from another equivalent weight, e.g., $EW_b$. For example, an equivalent weight of about 800 would be considered to be different from an equivalent weight of about 750.

Referring again to FIG. 9A, the liquid material closest in proximity to the anode 904, i.e., layer 902a, has a higher EW as compared to liquid materials 902b through 902f. In some embodiments, the equivalent weights of liquid materials 902a through 902f follow the trend of: $EW_a > EW_b > EW_c > EW_d > EW_e > EW_f$, with liquid material 902f, which is closest in proximity to cathode 906, having the lowest equivalent weight.

In some embodiments, at least one of liquid materials 902a, 902b, 902c, 902d, 902e, and 902f has an equivalent weight below 1500. In some embodiments, at least one of liquid materials 902a, 902b, 902c, 902d, 902e, and 902f has an equivalent weight below 1000. In some embodiments, at least one of liquid materials 902a, 902b, 902c, 902d, 902e, and 902f has an equivalent weight below 800. In some embodiments, at least one of liquid materials 902a, 902b, 902c, 902d, 902e, and 902f has an equivalent weight below 500. The conductivities of representative PEMs prepared from the presently disclosed liquid materials having different equivalent weights at fully hydrated conditions are provided in FIGS. 4 through 8.

Figure 9B:
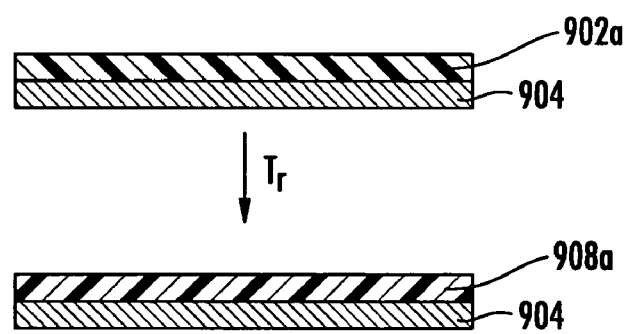

Referring now to FIG. 9B, in some embodiments, to decrease the methanol permeability of PEM 900 at anode 904, a high EW liquid material, e.g., 902a having an equivalent weight $EW_a$, is disposed, e.g., applied or spin coated, onto a substrate, e.g., anode 904, to form a layer of liquid material 902a on anode 904, followed by treating with treating process $T_r$ to form treated liquid material 908a. Treated liquid material 908a is coated with a lower EW liquid material, e.g., 902b, with an equivalent weight $EW_b$, which is then treated to form treated liquid material 908b (not shown). This procedure is repeated as often as desired to form PEM 900 comprising a gradient of equivalent weights, e.g., $EW_a$ through $EW_f$. Thus, in some embodiments, the treated liquid material, e.g., 908f (not shown), closest in proximity with cathode 906 has the lowest EW, e.g., $EW_f$. Accordingly, the presently disclosed method can provide for a decrease in methanol permeability at anode 904 and can promote increasingly facile proton transport through the cross section of PEM 900.

Thus, in some embodiments, PEM 900 comprises a plurality of layers of a polymeric electrolyte, wherein the plurality of layers of a polymeric electrolyte comprises at least a first layer of a first polymeric electrolyte comprising a material having a first equivalent weight and at least a second layer of a second polymeric electrolyte comprising a material having a second equivalent weight. In some embodiments, the plurality of layers of a polymeric electrolyte comprises a gradient of equivalent weights.

Thus, in some embodiments, the presently disclosed subject matter provides method for preparing a polymeric electrolyte comprising a plurality of equivalent weights, the method comprising:
(a) applying a first liquid precursor material having a first equivalent weight to a substrate;
(b) treating the first liquid precursor material to form a first layer of treated liquid precursor material on the substrate;
(c) applying a second liquid precursor material having a second equivalent weight to the first layer of treated liquid precursor material on the substrate; and
(d) treating the second liquid precursor material to form a polymeric electrolyte comprising a plurality of equivalent weights.

In some embodiments, the first liquid precursor material and the second liquid precursor material are selected from the group consisting of a proton conducting material, a precursor to a proton conducting material, and combinations thereof. In some embodiments, the first equivalent weight is greater than the second equivalent weight.

In some embodiments, the substrate is selected from the group consisting of an anode and a cathode. In some embodiments, the treating of the first liquid precursor material, the second liquid precursor material, and the plurality of liquid precursor materials is selected from the group consisting of a curing process, a chemical modification process, a network forming process, a solvent evaporation process, and combinations thereof.

In some embodiments, the method comprises repeating steps (c) through (d) with a predetermined plurality of liquid precursor materials comprising a plurality of equivalent weights to form a polymeric electrolyte comprising a plurality of equivalent weights, wherein the plurality of liquid precursor materials are selected from the group consisting of a proton conducting material, a precursor to a proton conducting material, and combinations thereof. In some embodiments, the second equivalent weight is greater than the plurality of equivalents weights.

Thus, in some embodiments, the presently disclosed subject matter provides a polymeric electrolyte comprising a plurality of equivalent weights prepared by the presently disclosed method. In some embodiments, the presently disclosed subject matter provides an electrochemical cell comprising the presently disclosed polymeric electrolyte comprising a gradient of equivalent weights. In some embodiments, the electrochemical cell is selected from the group consisting of a fuel cell, a chlor-alkali cell, and a battery.

The performance of the presently disclosed proton exchange membranes can be evaluated by measuring the conductivity, power density, durability, and longevity, among others.

IV. Method for Preparing a Membrane Electrode Assembly (MEA)

The presently disclosed subject matter also provides a method for preparing a membrane electrode assembly (MEA). In some embodiments, the method for preparing a membrane electrode assembly comprises preparing a processible catalyst ink composition using the presently described liquid precursor materials. Further, in some embodiments, the method for preparing a membrane electrode assembly comprises providing a proton exchange membrane prepared by the presently disclosed methods, coating the proton exchange membrane with a processible catalyst ink composition to form a coated proton exchange membrane, and in some embodiments, applying an electrode material to the coated proton exchange membrane.

IV.A. Method for Preparing a Processible Catalyst Ink Composition

In some embodiments, the presently disclosed subject matter describes a method for preparing a processible catalyst ink composition, the method comprising:

(a) providing a liquid precursor material; and
(b) mixing the liquid precursor material with a catalyst to form a processible catalyst ink composition.

In some embodiments, the liquid precursor material comprises a liquid perfluoropolyether material. In some embodiments, the liquid perfluoropolyether material comprises end groups, wherein the end groups are chemically stable after curing. In some embodiments, the chemically stable end groups are selected from one of aryl end groups and fluorinated vinyl ether end groups. In some embodiments, the aryl end groups comprise styrenyl end groups.

In some embodiments, the method further comprises mixing the liquid precursor material with a monomer, such as a vinyl monomer, and a crosslinking agent. In some embodiments, the vinyl monomer comprises a proton conducting species. In some embodiments, the proton conducting species is selected from one of an acidic material and a precursor to an acidic material.

In some embodiments, the processible catalyst ink composition comprises a catalyst. In some embodiments, the catalyst comprises a metal selected from the group consisting of platinum, ruthenium, molybdenum, chromium, and combinations thereof. In some embodiments, the catalyst is selected from one of a platinum catalyst and a platinum alloy catalyst. In some embodiments, the processible catalyst ink composition comprises an electrode material. In some embodiments, the electrode material comprises carbon black.

In some embodiments, the method comprises treating the processible catalyst ink composition. In some embodiments, the treating of the processible catalyst ink composition comprises a treating process selected from the group consisting of a curing process, a chemical modification process, a network forming process, a solvent evaporation process, and combinations thereof.

Thus, in some embodiments, the presently disclosed subject matter provides a processible catalyst ink composition prepared by the method described herein.

IV.B. Method for Applying a Processible Catalyst Ink Composition to a Substrate

In some embodiments, the presently disclosed subject matter provides a method for applying a processible catalyst ink composition to a substrate. In some embodiments, the substrate comprises an electrode material. In some embodiments, the substrate comprises a proton exchange membrane.

Figure 10A:
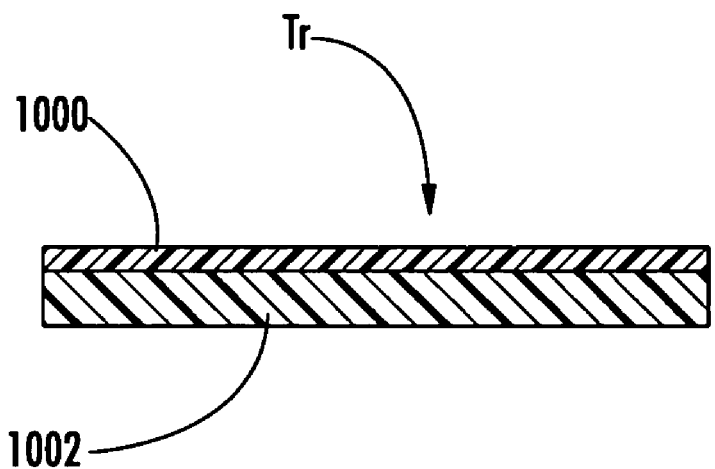
FIGS. 10A and 10B are schematic representations of an embodiment of the presently disclosed method for forming a catalyst ink tie layer.

Referring now to FIG. 10A, in some embodiments, a processible catalyst ink composition 1000, as described immediately above, is applied to an electrode material 1002. In some embodiments, electrode material 1002 comprises carbon cloth. In some embodiments, electrode material 1002 comprises carbon paper. Processible catalyst ink composition 1000 is subsequently treated by a treating process $T_r$, to form a catalyst tie layer (not shown), which provides for good contact with electrode material 1002.

Figure 10B:
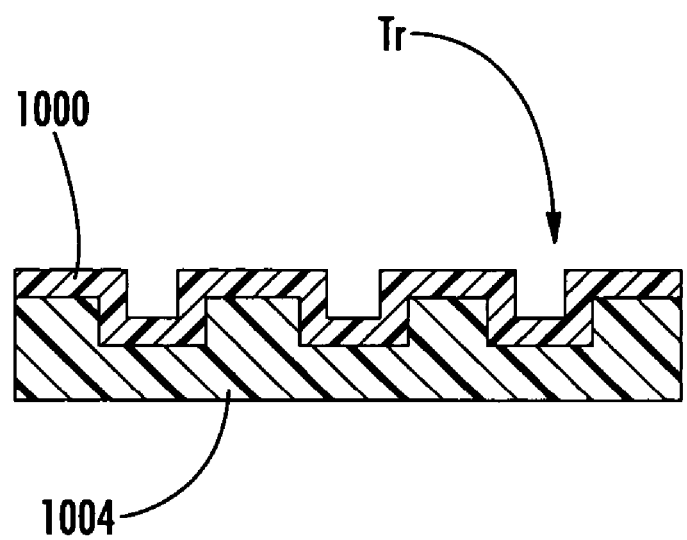

Referring now to FIG. 10B, in some embodiments, processible catalyst ink composition 1000 is applied to a patterned proton exchange membrane 1004. Processible catalyst ink composition 1000 is subsequently treated by a treating process $T_r$, to form a catalyst tie layer (not shown), which provides for good contact with proton exchange membrane 1004.

The method used to coat one of or both of electrode 1002 and proton exchange membrane 1004 can be selected from the group including but not limited to chemical vapor deposition (CVD), electrospray, electric field desorption, rf-plasma enhanced CVD, flame spray deposition, ink jet printing, or pulse laser desorption. In some embodiments, the method comprises treating the processible catalyst ink composition. In some embodiments, the treating of the processible catalyst ink composition comprises a treating process selected from the group consisting of a curing process, a chemical modification process, a network forming process, solvent evaporation process, and combinations thereof.

The presently described methods can be performed independently for use in different membrane electrode assemblies. That is, in one membrane electrode assembly, the presently disclosed method can be used to coat an electrode material, whereas in another membrane electrode assembly, the presently disclosed method can be used to coat a proton exchange membrane. Further, both of these methods, e.g., the methods described in FIG. 10A and FIG. 10B respectively, can be used to prepare the same membrane electrode assembly.

IV.C. Method for Conformally Coating a Proton Exchange Membrane

In some embodiments, the presently disclosed subject matter provides a method for conformally coating a proton exchange membrane with at least one of a processible catalyst ink composition and an electrode material. By "conformally coating" it is meant that the coating of, for example, the processible catalyst ink composition and/or the electrode material, is in conductive contact with the features comprising, for example, the proton exchange membrane, and thereby conforms to the geometry of the features thereof.

Figure 11A:
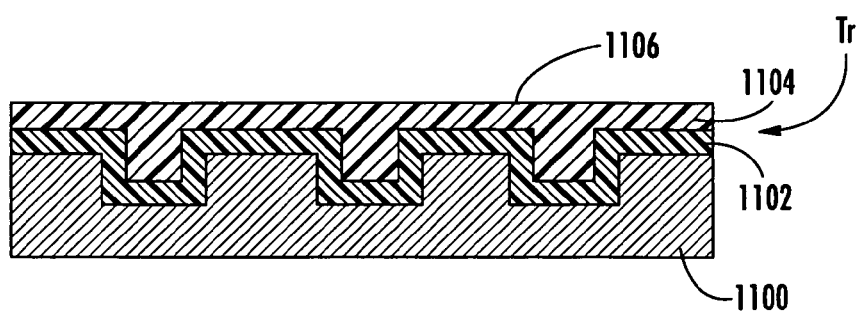
FIGS. 11A-11C are schematic representations of embodiments of the presently disclosed method for coating a patterned proton exchange membrane with a processible catalyst ink composition and an electrode material.

Referring now to FIG. 11A, in some embodiments, a patterned PEM 1100 is coated conformally with a processible catalyst ink composition 1102 followed by coating with an electrode material 1104, such as carbon black, to form a planarized surface 1106 of electrode material 1104. In some embodiments, processible catalyst ink composition 1102 is then treated by a treating process $T_r$. When operationally positioned in a membrane electrode assembly (not shown), the planarized coating of the electrode material allows the membrane electrode assembly to have a flat surface on at least one side.

Figure 11B:
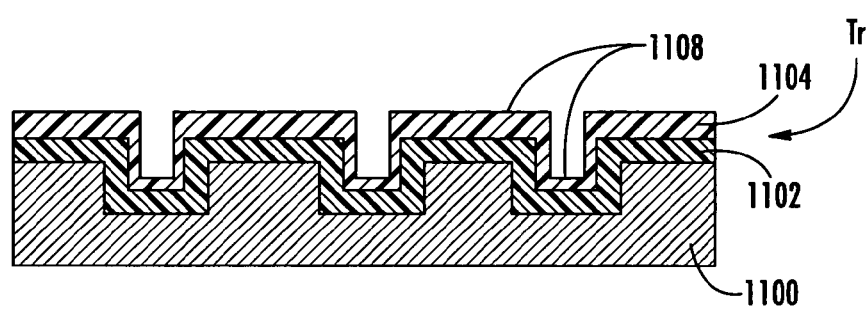

Referring now to FIG. 11B, in some embodiments, patterned PEM 1100 is coated conformally with processible catalyst ink composition 1102, followed by coating with electrode material 1104 to form a conformal surface 1108 of electrode material 1104. In some embodiments, processible catalyst ink composition 1102 is then treated by a treating process $T_r$.

Figure 11C:
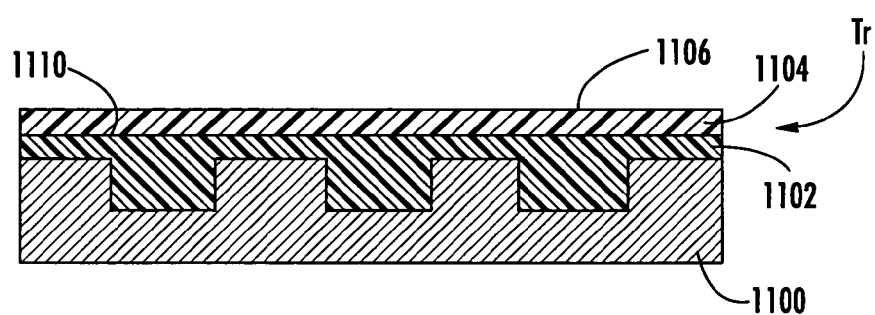

Referring now to FIG. 11C, in some embodiments, patterned PEM 1100 is coated conformally with processible catalyst ink composition 1102 to form a planarized surface 1110 of processible catalyst ink composition 1102. This step is followed by coating with electrode material 1104 to form a planarized surface 1106 of electrode material 1104. In some embodiments, processible catalyst ink composition 1102 is then treated by a treating process $T_r$. When operationally positioned in a membrane electrode assembly (not shown), the planarized coating of the electrode material allows the membrane electrode assembly to have a flat surface on at least one side.

Accordingly, in some embodiments, the method comprises conformally applying the processible catalyst ink composition to at least one of the proton exchange membrane and the electrode material.

Figure 12A:
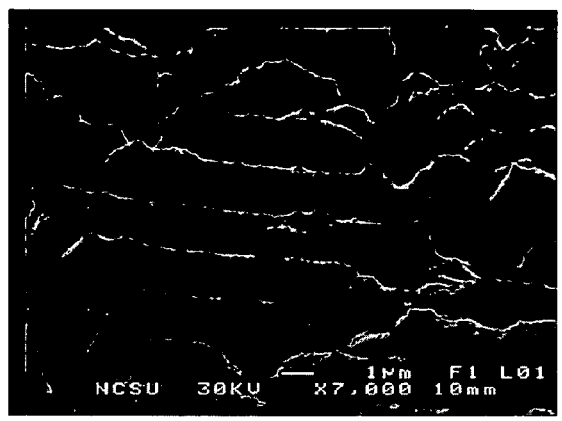
FIGS. 12A and 12B are scanning electron micrographs of embodiments of the presently disclosed patterned PEMs conformally coated with a catalyst by using an electrospray method.
Figure 12B:
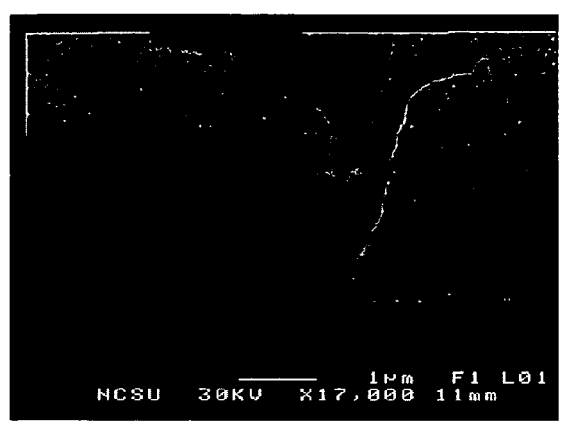
Figure 13:
FIG. 13 is a scanning electron micrograph of an embodiment of a presently disclosed patterned PEM conformally coated with a catalyst by using a vapor-deposition method.

By way of example, scanning electron micrographs of a patterned PEM conformally coated with a catalyst by using an electrospray deposition technique are shown in FIGS. 12A and 12B. Further, a scanning electron micrograph of a patterned PEM conformally coated with a catalyst by using a vapor-deposition technique is shown in FIG. 13. The preparation of each of these PEMs is described in Example 8.

IV.D. Method for Preparing a Membrane Electrode Assembly (MEA)

The presently disclosed subject matter provides a method for preparing a membrane electrode assembly. In some embodiments, the method for preparing a membrane electrode assembly comprises at least one of the presently disclosed methods for preparing a proton exchange membrane, preparing a processible catalyst ink composition, applying a processible catalyst ink composition to a substrate, and conformally coating a proton exchange membrane.

Thus, in some embodiments, the method for forming a membrane electrode assembly comprises:
(a) providing a proton exchange membrane, wherein the proton exchange membrane is prepared from a liquid precursor material as described herein;
(b) providing a first catalyst material and a second catalyst material;
(c) providing a first electrode material and a second electrode material; and
(d) operationally positioning the proton exchange membrane, the first and the second catalyst material, and the first and the second electrode material in conductive communication to form a membrane electrode assembly.

Figures 14A, 14B:
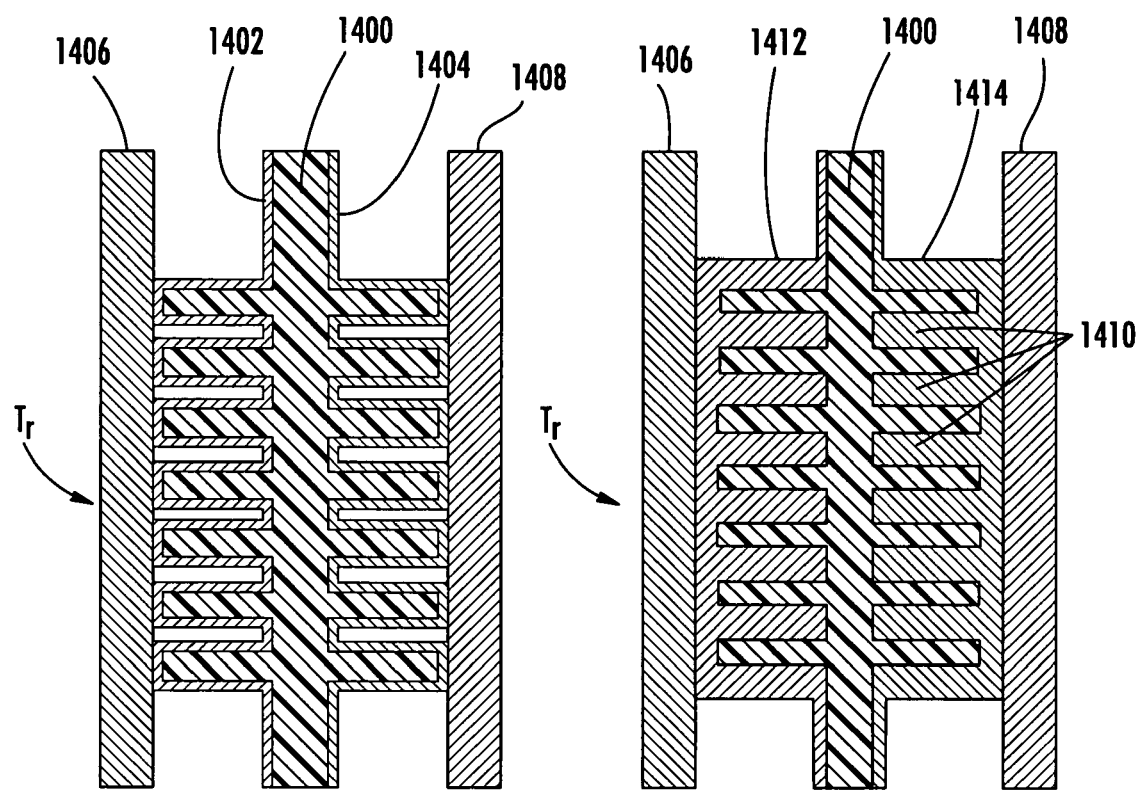
FIGS. 14A and 14B are schematic representations of embodiments of the presently disclosed membrane electrode assemblies.

Referring now to FIG. 14A, an embodiment of the presently disclosed method for forming a membrane electrode assembly is provided. Continuing with FIG. 14A, a proton exchange membrane 1400 is provided. In some embodiments, proton exchange membrane 1400 comprises a three-dimensional geometry as depicted in FIG. 14A. In some embodiments, a first catalyst material 1402 and a second catalyst material 1404 are conformally contacted with proton exchange membrane 1400. A first electrode material 1406 is conformally contacted with first catalyst material 1402. A second electrode material 1408 is contacted with second catalyst material 1404. In some embodiments, first electrode material 1406 and second electrode material 1408 comprise a planar geometry. In some embodiments, the components of the membrane electrode assembly can be treated by a treating process $T_r$ to provide good contact between the components and mechanical stability.

Thus, the presently disclosed subject matter provides a membrane electrode assembly comprising a three-dimensional proton exchange membrane and a two-dimensional electrode with conformal catalyst loading. By three-dimensional it is meant that, for example, the proton exchange membrane comprises features that extend from a planar surface (see, for example, the plurality of structural features 120 of FIG. 1B). By two-dimensional it is meant that, for example, the electrode material comprises a planar surface which is in conductive communication with the proton exchange membrane (see, for example, first electrode material 1406 and second electrode material 1408 of FIG. 14A).

Referring now to FIG. 14B, a proton exchange membrane 1400 is provided. In some embodiments, proton exchange membrane 1400 comprises a three-dimensional geometry as depicted in FIG. 14B, wherein the three-dimensional geometry comprises a plurality of recesses 1410. In some embodiments, a first catalyst material 1412 and a second catalyst material 1414 are operationally disposed within recesses 1410. A first electrode material 1406 is conformally contacted with first catalyst material 1412. A second electrode material 1408 is contacted with second catalyst material 1414. In some embodiments, first electrode material 1406 and second electrode material 1408 comprise a planar, two dimensional geometry. In some embodiments, the components of the membrane electrode assembly can be treated by a treating process $T_r$ to provide good contact between the components and mechanical stability. Thus, the presently disclosed subject matter provides a membrane electrode assembly comprising a three-dimensional proton exchange membrane and a two-dimensional electrode with non-conformal catalyst loading.

Figure 15:
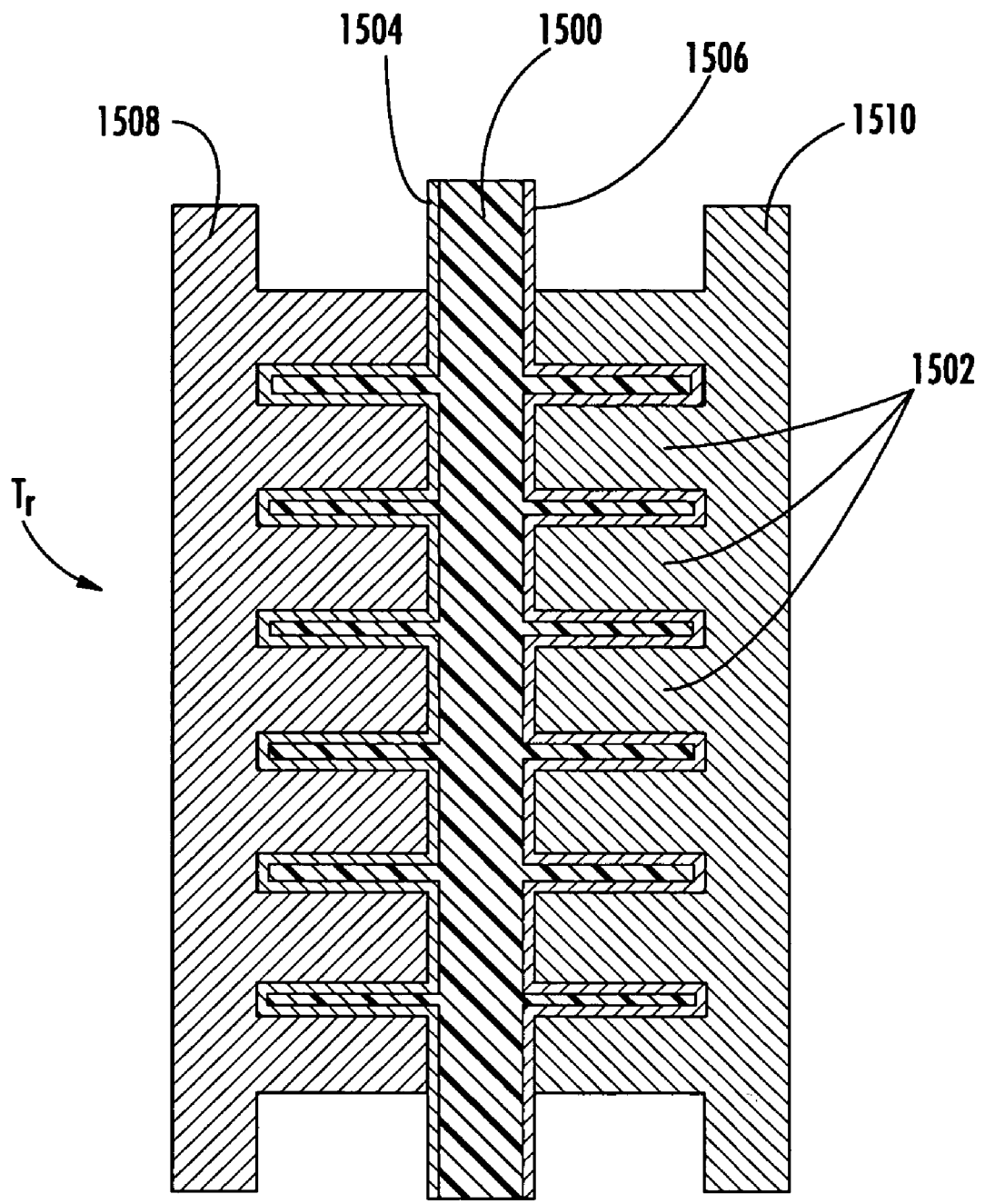
FIG. 15 is a schematic representation of an embodiment of a presently disclosed three dimensional membrane electrode assembly (MEA) prepared from a three dimensional proton exchange membrane (PEM) and a three dimensional electrode with conformal catalyst loadings.

Referring now to FIG. 15, a proton exchange membrane 1500 is provided. In some embodiments, proton exchange membrane 1500 comprises a three-dimensional geometry comprising a plurality of recesses 1502. In some embodiments, a first catalyst material 1504 and a second catalyst material 1506 are conformally contacted with proton exchange membrane 1500. In some embodiments, a first electrode material 1508 is disposed in recesses 1502 and is operationally contacted with first catalyst material 1504. In some embodiments, a second electrode material 1510 is disposed in recesses 1502 and is operationally contacted with catalyst material 1506. In some embodiments, the components of the membrane electrode assembly can be treated by a treating process $T_r$ to provide good contact between the components and mechanical stability. Thus, the presently disclosed subject matter provides a three-dimensional membrane electrode assembly comprising a three-dimensional proton exchange membrane and three-dimensional electrode materials with a conformal catalyst loading.

In some embodiments, the proton exchange membrane, e.g., 1400 of FIGS. 14A and 14B and 1500 of FIG. 15, is preformed by a method described herein. In some embodiments, the proton exchange membrane is formed by operationally disposing a liquid precursor material between two electrode materials, e.g., first electrode material 1508 and second electrode material 1510 of FIG. 15, and then treating the liquid precursor material.

Thus, in some embodiments, the presently disclosed subject matter provides a method for preparing a membrane electrode assembly, the method comprising
(a) providing a first electrode material;
(b) providing a second electrode material;
(c) positioning the first electrode material and the second electrode material in a spatial arrangement such that a gap is formed between the first electrode material and the second electrode material;
(d) deposing a liquid precursor material in the gap between the first electrode material and the second electrode material; and
(e) treating the liquid precursor material to form a membrane electrode assembly.

In some embodiments, the liquid precursor material is selected from the group consisting of a proton conducting material, a precursor to a proton conducting material, and combinations thereof.

In some embodiments, the method comprises:
(a) contacting the first electrode material with a first catalyst material;

(b) contacting the second electrode material with a second catalyst material; and (c) positioning the first electrode material and the second electrode material in a spatial arrangement such that the first catalyst material and the second catalyst material face each other and a gap is formed between the first catalyst material and the second catalyst material.

Further, in some embodiments, at least one of the first catalyst material and the second catalyst material comprises a processible catalyst ink composition. In some embodiments, the method further comprises applying the processible catalyst ink composition to the proton exchange membrane. In some embodiments, the method comprises applying the processible catalyst ink composition to at least one of the first and the second electrode material. In some embodiments, the method comprises applying the processible catalyst ink composition to the proton exchange membrane and at least one of the first electrode material and the second electrode material.

In some embodiments, the processible catalyst ink composition is applied by a process selected from the group including, but not limited to, a chemical vapor deposition (CVD) process; an electrospray process; an electric field desorption process; a rf-plasma enhanced CVD process; a flame spray deposition process; an ink jet printing process; and a pulse laser desorption process.

In some embodiments, the electrode material is selected from the group consisting of carbon cloth, carbon paper, and carbon black. In some embodiments, the electrode material comprises a patterned electrode material.

Thus, in some embodiments, the presently disclosed subject matter provides a membrane electrode assembly (MEA) prepared by the methods described herein.

Figure 16:
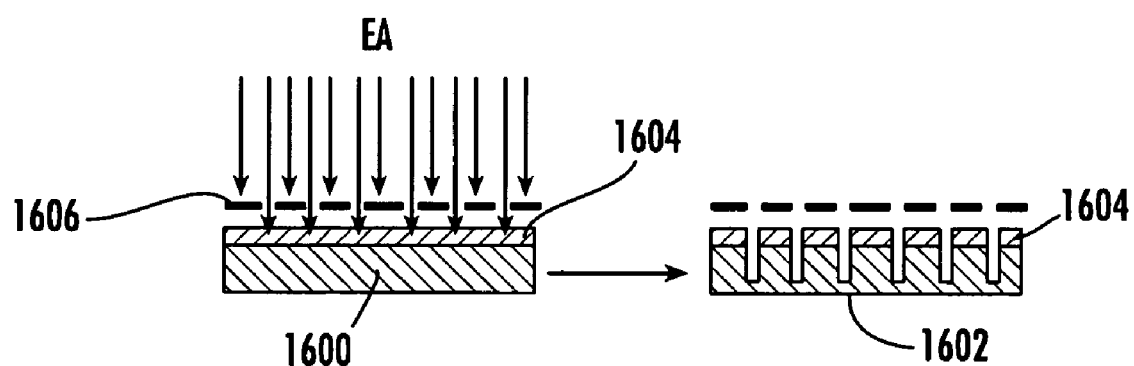
FIG. 16 depicts a lithography method used to pattern an electrode material, such as carbon black.

In some embodiments, the electrode material, e.g., carbon cloth, carbon paper, and/or carbon black, is treated to increase its surface area to increase the power density of the electrochemical cell within which the electrode material is operationally disposed. Referring now to FIG. 16, an electrode material 1600 is provided. Electrode material 1600 can be patterned to form a patterned electrode material 1602 using traditional lithography technologies (not shown) or patterned directly using an electron beam, e.g., the etching agent EA of FIG. 16. In some embodiments, electrode material 1600 can further comprise a photoresist 1604, for example, for use in electron beam lithography. In some embodiments, a mask 1606 can be provided, for example for use in plasma etching, such as oxygen reactive ion etching.

Thus, in some embodiments, the electrode material is patterned by a process selected from the group including but not limited to:

(a) a lithography process;

(b) a direct electron beam process;

(c) an electron beam lithography process using a photoresist; and (d) a plasma etching process using a mask.

In some embodiments, the plasma etching process comprises an oxygen reactive ion etching process.

V. Method for Forming an Electrochemical Cell

Figure 17A:
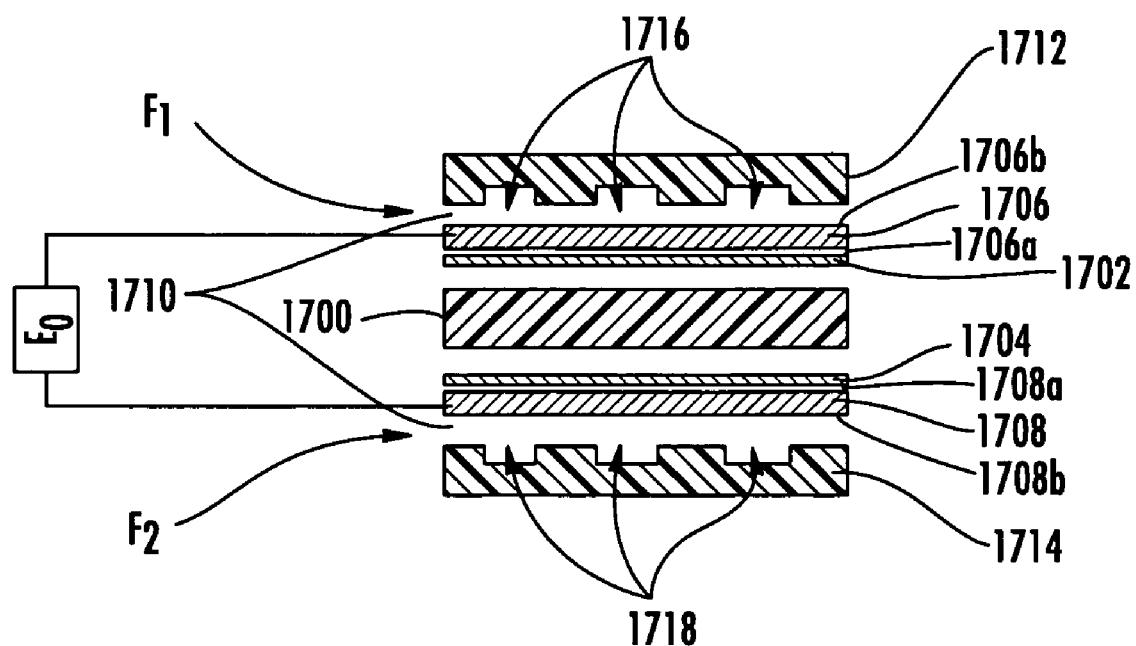
FIGS. 17A and 17B are schematic representations of an embodiment of a presently disclosed microfluidic fuel cell.

In some embodiments, the presently disclosed subject matter provides a method for forming an electrochemical cell, such as a fuel cell. Referring now to FIG. 17A, a proton exchange membrane 1700 is provided. Proton exchange membrane 1700 can be prepared from the presently disclosed liquid precursor materials by the methods described herein. Proton exchange membrane 1700 is operationally positioned between and contacted with a first catalyst material 1702 and a second catalyst material 1704. In some embodiments, first catalyst material 1702 and second catalyst material 1704 each independently comprise a metal selected from the group consisting of platinum, ruthenium, molybdenum, chromium, and combinations thereof.

Continuing with FIG. 17A, first catalyst material 1702 is operationally contacted with a first electrode material 1706. In some embodiments, first electrode material 1706 comprises a first surface 1706a and a second surface 1706b. Thus, in some embodiments, at least one of first surface 1706a and second surface 1706b is operationally contacted with first catalyst material 1702. In some embodiments, at least one of first surface 1706a and second surface 1706b are coated with first catalyst material 1702. In some embodiments, at least one of first surface 1706a and second surface 1706b is impregnated with first catalyst material 1702.

Continuing with FIG. 17A, second catalyst material 1704 is operationally contacted with second electrode material 1708. In some embodiments, second electrode material 1708 comprises a first surface 1708a and a second surface 1708b. Thus, in some embodiments, at least one of first surface 1708a and second surface 1708b is operationally contacted with second catalyst material 1704. In some embodiments, at least one of first surface 1708a and second surface 1708b are coated with second catalyst material 1704. In some embodiments, at least one of first surface 1708a and second surface 1708b is impregnated with second catalyst material 1704.

Continuing with FIG. 17A, membrane electrode assembly 1710 is thus formed by operationally positioning proton exchange membrane 1700, first catalyst layer 1702, first electrode material 1706, second catalyst layer 1704, and second electrode material 1708. Membrane electrode assembly 1710 can be operationally positioned in an electrochemical cell, such as a fuel cell.

Continuing on with FIG. 17A, a first outer layer 1712 and a second outer layer 1714 are provided. In some embodiments, first outer layer 1712 and second outer layer 1714 are comprised of a perfluoropolyether (PFPE) material as described herein. First outer layer 1712 can further comprise a plurality of microfluidic channels 1716 through which fuel $F_1$ can be introduced and second outer layer 1714 can further comprise a plurality of microfluidic channels 1718 through which fuel $F_2$ can be introduced.

In some embodiments, first electrode material 1706 comprises an anode and is in fluid communication with fuel $F_1$, which, in some embodiments, comprises an anodic fuel. In some embodiments, the anodic fuel, e.g., fuel $F_1$, is selected from the group consisting of $H_2$, an alkane, an alkyl alcohol, a dialkyl ether, and a glycol. In some embodiments, the alkane is selected from the group consisting of methane, ethane, propane, and butane. In some embodiments, the alkyl alcohol is selected from the group consisting of methanol, ethanol, propanol, butanol, pentanol, and hexanol. In some embodiments, the alkyl alcohol comprises methanol. In some embodiments, the dialkyl ether comprises dimethyl ether. In some embodiments, the glycol comprises ethylene glycol.

In some embodiments, second electrode material 1708 comprises a cathode and is in fluid communication with fuel $F_2$, which, in some embodiments, comprises a cathodic fuel. In some embodiments, the cathodic fuel, e.g., fuel $F_2$, comprises an oxygen ($O_2$) containing gas, such as air. In some embodiments, the cathodic fuel comprises an air/water mixture.

In some embodiments, the electrochemical cell comprises at least one electrical output connection $E_o$.

Figure 17B:
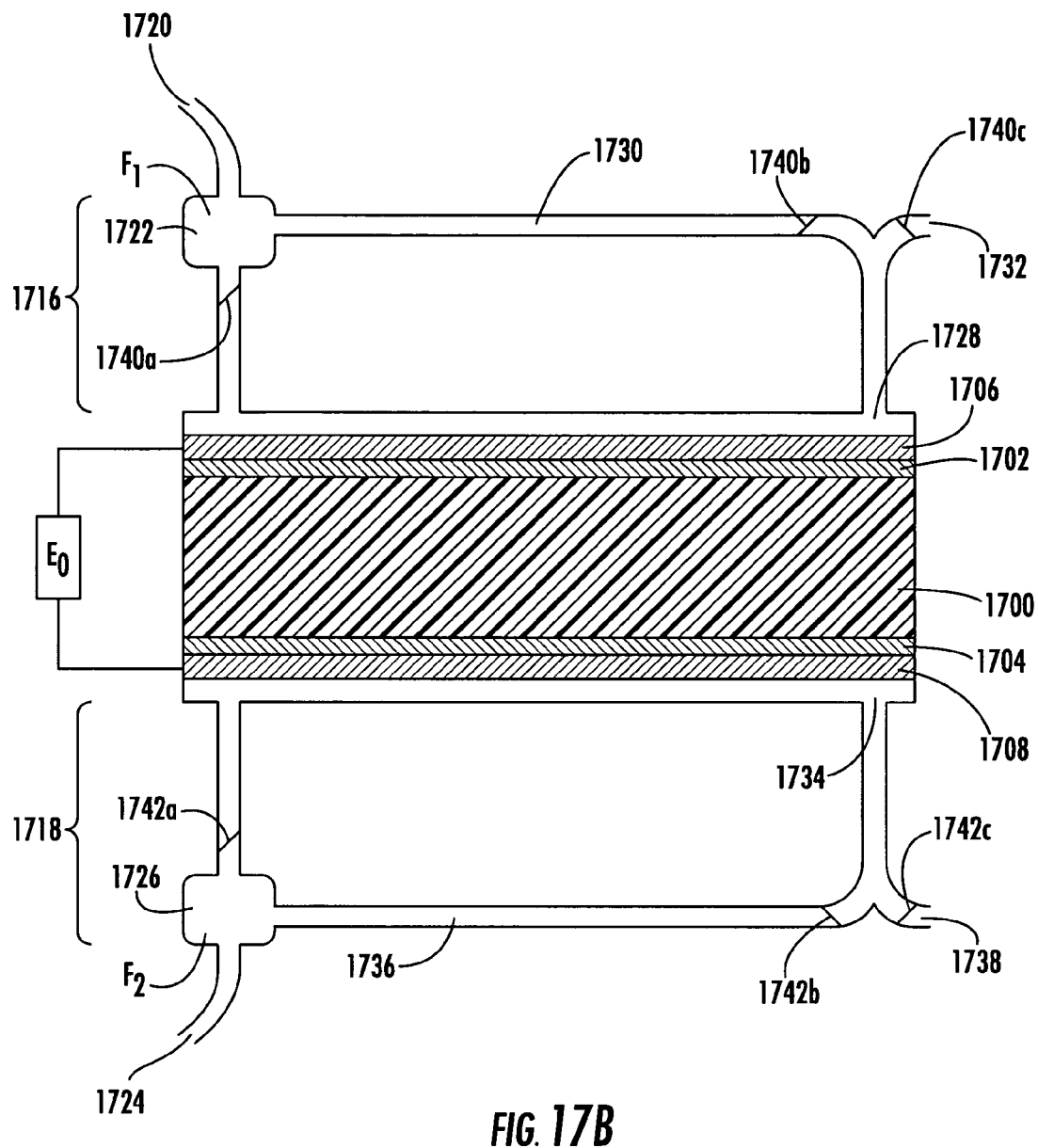

Referring now to FIG. 17B, in some embodiments, the plurality of microfluidic channels 1716 comprises at least one inlet aperture 1720. In some embodiments, inlet aperture 1720 is in fluid communication with a fuel source 1722. In some embodiments, fuel source 1722 comprises fuel $F_1$. In some embodiments, fuel $F_1$ is selected from the group consisting of an anodic fuel and a cathodic fuel.

Continuing with FIG. 17B, in some embodiments, the plurality of microfluidic channels 1718 comprises at least one inlet aperture 1724. In some embodiments, inlet aperture 1724 is in fluid communication with a fuel source 1726. In some embodiments, fuel source 1726 comprises fuel $F_2$. In some embodiments, fuel $F_2$ is selected from the group consisting of an anodic fuel and a cathodic fuel.

In some embodiments, the plurality of microfluidic channels 1716 comprises an outlet aperture 1728. In some embodiments, outlet aperture 1728 is in fluid communication with a fuel recirculation channel 1730. In some embodiments, the outlet aperture is in fluid communication with a waste exhaust port 1732.

In some embodiments, the plurality of microfluidic channels 1718 comprises an outlet aperture 1734. In some embodiments, outlet aperture 1734 is in fluid communication with a fuel recirculation channel 1736. In some embodiments, the outlet aperture is in fluid communication with a waste exhaust port 1738.

In some embodiments, the plurality of microfluidic channels 1716 comprises a plurality of valves, e.g., 1740a, 1740b, and 1740c. In some embodiments, plurality of valves 1740a, 1740b, and 1740c comprise a pressure actuated valve (not shown). In some embodiments, the plurality of microfluidic channels 1718 comprises a plurality of valves, e.g., 1742a, 1742b, and 1742c. In some embodiments, plurality of valves 1740a, 1740b, and 1740c comprise a pressure actuated valve (not shown).

In some embodiments, the plurality of microfluidic channels 1716 and the plurality of microfluidic channels 1718 each comprise a network of microfluidic channels (not shown).

In some embodiments, the microfluidic device is produced by a soft lithography process. As used herein, the term "soft lithography" refers to a process by which micrometer and sub-micrometer features are transferred to a substrate through the use of elastomeric stamps. Soft lithography has emerged as an alternative to traditional photolithography processes for producing feature sizes smaller than about 100 nm. As used herein, the term "soft lithography" encompasses several processes including, but not limited to, imprint lithography (IL), replica molding, microcontact printing (MCP), micromolding in capillaries (MIMIC), and solvent-assisted micromolding (SAMIM).

Referring now to FIGS. 18A-18C, a schematic representation of an embodiment of the presently disclosed method for forming a layer of perfluoropolyether (PFPE) material comprising a plurality of microfluidic channels is shown. A substrate 1800 having a patterned surface 1802 comprising a raised protrusion 1804 is depicted. Accordingly, the patterned surface 1802 of the substrate 1800 comprises at least one raised protrusion 1804 which forms the shape of a pattern. In some embodiments, the patterned surface 1802 of the substrate 1800 comprises a plurality of raised protrusions 1804 which form a complex pattern.

As best seen in FIG. 18B, a polymeric precursor 1806 is disposed on patterned surface 1802 of substrate 1800. Polymeric precursor 1806 can comprise a perfluoropolyether. As shown in FIG. 18B, polymeric precursor 1806 is treated by a treating process $T_r$, for example, irradiation with ultraviolet light, to form a patterned layer 1808 of a photocured perfluoropolyether as shown in FIG. 18C.

As shown in FIG. 18C, the patterned layer 1808 of the photocured perfluoropolyether comprises a recess 1810 that is formed in the bottom surface of the patterned layer 1808. The dimensions of recess 1810 correspond to the dimensions of the raised protrusion 1804 of patterned surface 1802 of substrate 1800. In some embodiments, recess 1810 comprises at least one channel 1812, which in some embodiments of the presently disclosed subject matter comprises a microscale channel. Patterned layer 1808 is removed from patterned surface 1802 of substrate 1800 to yield microfluidic device 1814. Thus, in some embodiments, the soft lithography process comprises contacting a liquid precursor material with a patterned substrate, e.g., a silicon wafer. In some embodiments, the process further comprises treating the liquid precursor material to form a crosslinked polymer. In some embodiments, the treating process is selected from the group consisting of a curing process, a chemical modification process, a network forming process, and combinations thereof.

In some embodiments, the process further comprises of removing the crosslinked polymer from the substrate, thereby creating a "stamp" of the desired pattern.

A poly(dimethyl siloxane) (PDMS) elastomeric material typically is used in such microfluidic devices. The swelling of the PDMS material, however, limits its use in direct methanol fuel cells and fuel cells comprising other organic liquids due to the disruption of the micrometer-sized features. Further, PDMS materials typically also are unstable to acids and bases.

The presently disclosed subject matter addresses the above-mentioned problems with PDMS elastomers in whole or in part by using a photocurable PFPE material. In some embodiments, the PFFE material comprises a fluorinated, functionalized PFPE material, which, in some embodiments, has liquid-like viscosities and can be cured into durable elastomers that exhibit the chemical resistance of typical fluoropolymers.

Thus, in some embodiments, the presently disclosed subject matter comprises cured PFPE-based materials. In some embodiments, the curing method comprises a free-radical cured method. In some embodiments, the free-radical cured method further comprises adding other monomers and macromonomers to the PFPE resin. The addition of other monomers and macromonomers to the PFPE resin allows the physical properties, including, but not limited to, modulus, flexural strength, wetting characteristics, permeability, adhesion, and reactivity, to be regulated.

VI. Method for Operating an Electrochemical Cell

The presently disclosed subject matter also provides a method for operating an electrochemical cell, such as a fuel cell. In some embodiments, the method comprises:
 (a) providing an electrochemical cell comprising at least one layer of a perfluoropolyether (PFPE) material comprising at least one microfluidic channel;
 (b) dispensing a first electrode reactant and a second electrode reactant into the electrochemical cell; and
 (c) generating an electrical output from the electrochemical cell.

In some embodiments, the proton exchange membrane of the electrochemical cell comprises a polymeric electrolyte prepared from a liquid precursor material as described herein.

In some embodiments, the first electrode reactant is selected from the group consisting of $H_2$, an alkane, an alkyl alcohol, a dialkyl ether and a glycol. In some embodiments, the alkane is selected from the group consisting of methane, ethane, propane, and butane. In some embodiments, the alkyl alcohol is selected from the group consisting of methanol, ethanol, propanol, butanol, pentanol, and hexanol. In some embodiments, the alkyl alcohol comprises methanol. In some embodiments, the dialkyl ether comprises dimethyl ether. In some embodiments, the glycol comprises ethylene glycol. In some embodiments, the second electrode reactant comprises an oxygen ($O_2$) containing gas, such as an air, and, in some embodiments, an air/water mixture.

In some embodiments, the method comprises extracting the electrical output generated by the electrochemical cell. In some embodiments, the electrical output ranges from about 100 milliwatts to about 20 watts.

In some embodiments, the method for operating an electrochemical cell further comprises supplying electrical power to a device. In some embodiments, the device comprises a stationary device. In some embodiments, the stationary device comprises an electrical generator. In some embodiments, the device comprises a portable device. In some embodiments, the portable device is selected from the group consisting of a portable electrical generator, a portable appliance, a power tool, an electronic device, a roadway or traffic sign, a backup power supply, and a personal vehicle. In some embodiments, the electronic device is selected from one of a consumer electronic device and a military electronic device. In some embodiments, the device comprises an automotive device.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Synthesis of Crosslinkable PFPE Liquid Precursors

Example 1.1 Synthesis of a Crosslinkable PFPE Liquid Precursor with a Styrene Linkage Styrene linkages are added to both chain ends of poly (tetrafluoroethylene-co-difluoroethylene oxide) a, w diol (ZDOL) (PFPE, Average Mn ca. 3800 g/mol) by an interfacial reaction. In a typical synthesis, PFPE (20 g, 5.26 mmol), solcane (10 mL), and tetrabutylammonium hydrogen sulfate (1.0 g, 2.95 mmol) are added into a round bottom flask. KOH (10 g, 0.18 mol) is dissolved in deionized water (20 mL) and the aqueous KOH solution is then added to the round bottom flask. After addition of 4-vinylbenzyl chloride (2 mL, 12.8 mmol), the reaction mixture is allowed to stir vigorously at 45° C. for 48 h. The product is passed through a 0.22-μm filter to remove the resulting brown solid. The solution is then extracted by deionized water three times and stirred with carbon black for 1 h to remove any impurities. The mixture is passed through a 0.22-μm filter to remove the carbon black and vacuum dried at room temperature to remove the solvent. The resulting product (S—PFPE) is a clear viscous liquid.

Example 1.2 Synthesis and Photocuring of Functional PFPE

A representative scheme for the synthesis and photocuring of functional PFPEs is provided in Scheme 1.

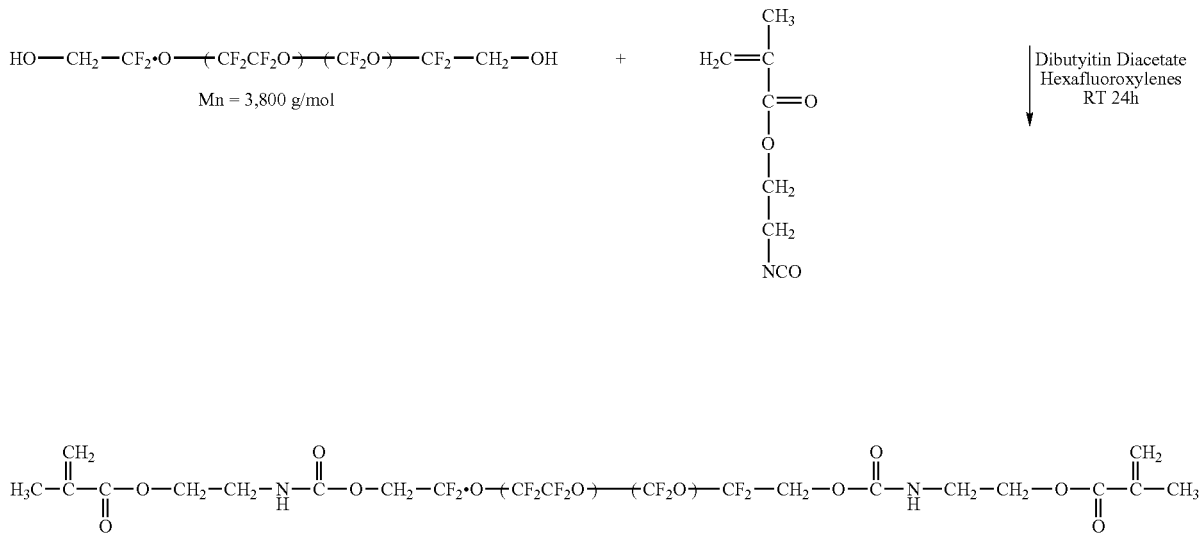

-continued

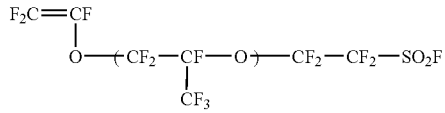 + 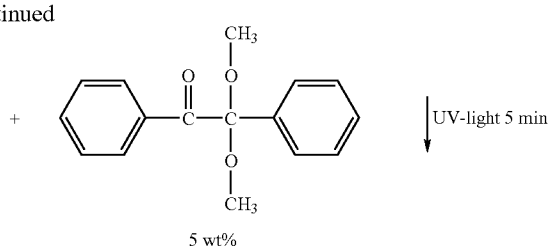

5 wt%

↓ UV-light 5 min

Crosslinked PFPE Network

Example 1.3. Representative Perfluoropolyethers

Perfluoropolyether materials of the presently disclosed subject matter include, but are not limited to, perfluoropolyether materials comprising a backbone structure as follows:

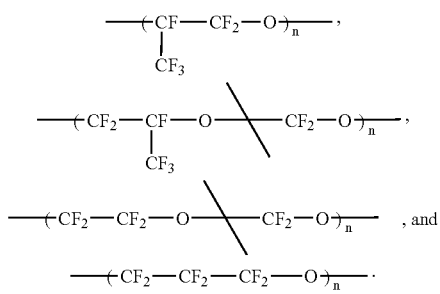

Example 2

Synthesis of Crosslink Systems

Example 2.1. General Considerations

A strong acid and a multifunctional monomer are crosslinked free radically or via a different chemical mechanism. The multifunctional monomer can be a strong acid and can have a functionality of at least two. An example of a strong acid that can be used in these crosslink systems for electrochemical cell applications is perfluoro-2-(2-fluorosulfonylethoxy)propyl vinyl ether (PSEPVE). Other superacids that can function either as the strong acid or as a multifunctional monomer are sulfonimide-based compounds.

The strong acid and multifunctional monomer are mixed in a round bottom flask under argon with fluorinated or perfluorinated solvent as needed. The ratios of the two components are varied for desired crosslink density and equivalent weight. Reaction conditions, such as temperature and reaction time, can vary depending on the particular components and ease of mixing.

A liquid precursor comprising the reaction mixture is poured onto a glass slide or a patterned substrate, such as a mold. A standard steel spacer is used to control the membrane thickness. The liquid precursor is chemically crosslinked by irradiation with UV light or thermally under nitrogen purge. The mechanism of chemically crosslinking depends on the initiator used. Once crosslinked networks are prepared, hydrolysis using base and acid converts any remaining conducting site into the acid for increased proton conduction.

Example 2.2. Multifunctional Monomer as a Fluorinated Divinylether

Nonconducting, difunctional monomers when reacted with strong acid result in a mechanically stable proton conducting network. Commercially available compounds with a functionality of two or more, such as 4,4'-bis(4-trifluorovinyloxy)biphenyl (Compound 1) are reacted with a strong acid, such as PSEPVE. In a liquid precursor state, the reaction mixture takes on the shape of the surface/mold and crosslinks free radically upon addition of initiator, thermally or photochemically, in an inert atmosphere.

Compound 1

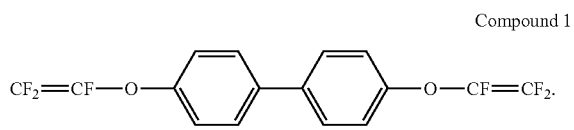

Fluorinated Divinylether

Example 2.3. Multifunctional Monomer as a Tris(trifluorovinyl)benzene

Liquid precursors lend themselves to be patternable if a crosslinking mechanism is viable. Free radical curing with trifunctional monomers provide a chemically crosslinked network available for proton conduction when cured with a strong acid. An example of a trifunctional monomer is tris(α,β,β-trifluorovinyl)benzene (Compound 2) that is prepared using 1,3,5-tribromobenzene (see Scheme 2). The starting material in Scheme 2 can also represent a trifunctional monomer for subsequent crosslinking with a strong acid. An example of a strong acid is PSEPVE. The reaction mixture in a liquid precursor state can be crosslinked as described in Example 2.2.

Compound 2

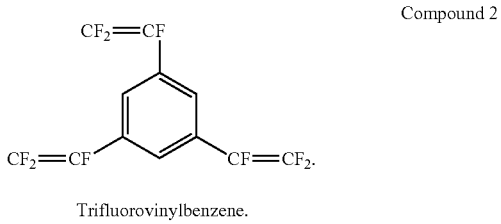

Trifluorovinylbenzene.

Example 2.4. Multifunctional Monomer as a Fluorinated Divinylether Sulfonimide

A difunctional macromonomer, which also is a superacid, reacts with another strong acid, such as PSEPVE, to achieve a highly conducting, mechanically stable network. In a liquid precursor form this reaction takes on the shape of any mold prior to crosslinking. Subsequent crosslinking results in high surface area, highly conductive membranes. An example of a superacid used as a difunctional macromonomer is a bis (PSEPVE-based) sulfonimide (Compound 3), which is prepared via sulfonimide chemistry (see Schemes 3 and 4). The reaction mixture can be cured under the conditions described in Example 2.2.

-continued

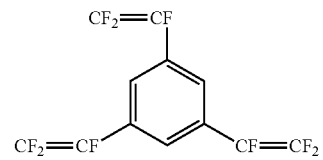

Compound 3.

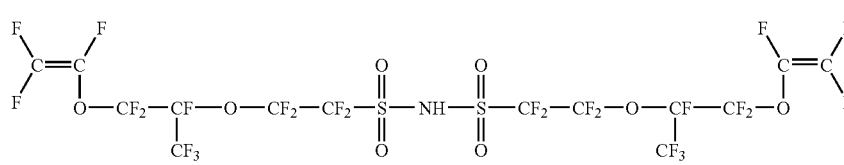

Fluorinated Divinyl Sulfonimide.

Example 2.5. Multifunctional Monomer as a Fluorinated Bisvinylether Disulfonimide Using a strong acid such as PSEPVE and a disulfonyl fluoride, a bisvinylether disulfonimide is prepared using sulfonimide chemistry to obtain this crosslinkable superacid monomer (Compound 4, Scheme 6). The disulfonyl fluoride can be prepared using a diiodoalkane, such as α,ω-diiodoperfluoroalkane (Scheme 5). The bisvinylether disulfonimide is reacted with another strong acid such as PSEPVE to form a highly conducting membrane. The reactants can be cured under the conditions described in Example 2.2.

Compound 4.

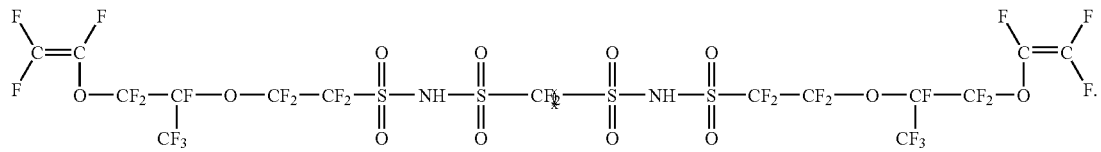

Fluorinated Divinylether Disulfonimide

Scheme 2. Tribromobenzene Converted to Tris(α,β,β-Trifluorovinyl)Benzene. (*See DesMarteau, D.D., et. al.* Chem. Commun., 2596-2597 (2003)).

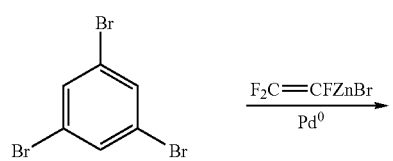

Scheme 3. Preparation of PSEPVE-based Silylated Sulfonimide. (*See DesMarteau, D. D., et. al.* Journal of Fluorine Chemistry, 125, 1231-1240 (2004)).

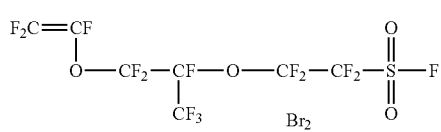

0° C.

-continued
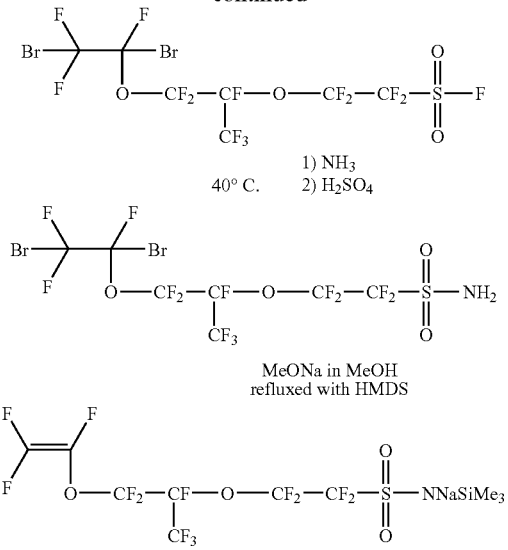
Scheme 5. Preparation of Disulfonyl Fluoride. (*See DesMarteau, D. D., et. al.* Journal of Flourine Chemistry, 125, 1179-1185 (2004)).
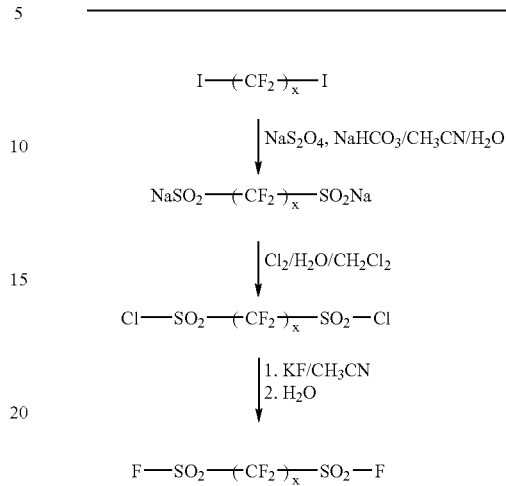
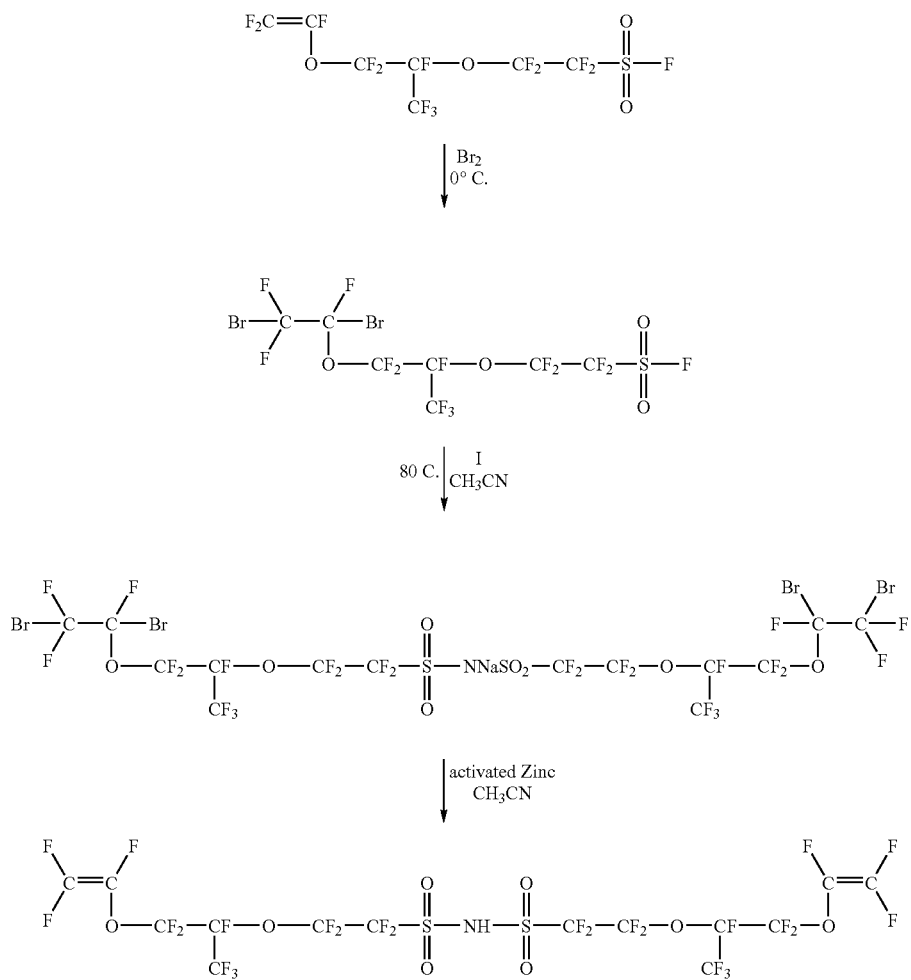

Scheme 6. Preparation of Bisvinylether Disulfonimide.

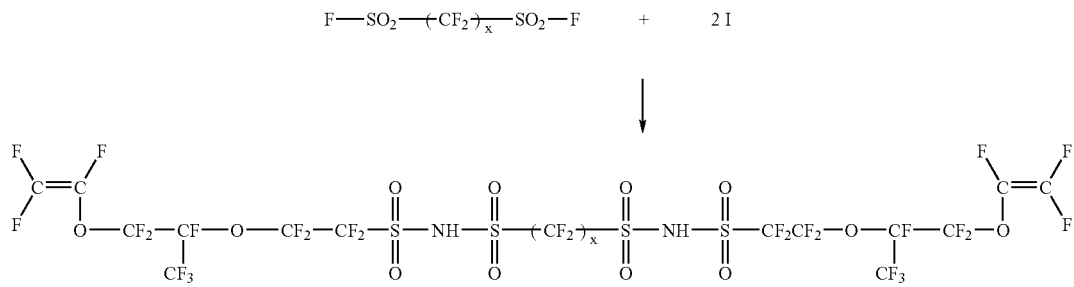

Example 3

Synthesis of Crosslinkable Terpolymer

Example 3.1. General Considerations

A terpolymer comprising a fluoroolefin, and strong acid, and a cure site monomer (CSM) of low molecular weight, is polymerized. An example of a fluoroolefin is tetrafluoroethylene (TFE) and for a strong acid, perfluoro-2-(2-fluorosulfonylethoxy) propyl vinyl ether (PSEPVE) is chosen. A typical polymerization can be loaded with 40% solids. The solvent chosen for TFE-based polymerizations is optionally carbon dioxide ($CO_2$). The initiator concentration tunes the desired molecular weight. Higher initiator concentration will lead to lower relative molecular weight, whereas a lower initiator concentration would result in higher relative molecular weight. The polymerization is conducted free radically with a thermal initiator. Reaction times are varied upon desired conversion. The polymerizations are preferably performed using cure site monomers that are commonly used in fluoroelastomer and perfluoroelastomer technologies. For example, the cure site monomers can include cyanovinyl ethers, bromine containing monomers, bromine containing olefins, bromine containing vinyl ethers, iodine containing monomers, iodine containing olefins, iodine containing vinyl ethers, fluorine containing olefins having a nitrile group, fluorine containing vinyl ethers having a nitrile group, 1,1,3,3,3-pentafluoropropene, perfluoro(2-phenoxypropyl) vinyl ether, and non-conjugated dienes.

Terpolymers formed by the polymerization of a fluoroolefin, a strong acid, and a cure site monomer (CSM) can be crosslinked after polymerization, prior to hydrolysis of the terpolymers. The polymerization product comprises a gum or liquid with Mooney viscosities of 160 and lower. The terpolymers are poured onto a mold of a desired pattern or onto a glass slide in an inert atmosphere. A standard steel spacer is used to control the membrane thickness between glass slides. The terpolymer takes on the shape of the patterned mold. Curing chemistry is optionally conducted as in fluoroelastomer and perfluoroelastomer technologies. The liquid precursor is chemically crosslinked by various cure systems including thermal or gamma radiation. Depending on the CSM, peroxide-based or bisphenolic cure systems also can be implemented. A chemically crosslinked membrane is created with higher active surface area than the geometric surface area occupied by the mold. Subsequent hydrolysis, with base and acid, results in a patterned, proton conducting membrane with high mechanical integrity.

Example 3.2. Terpolymer with Bromine-Containing Cure Site Monomer

A cure site monomer containing a bromine is selected for the polymerization of a terpolymer comprising a fluoroolefin, and strong acid and a cure site monomer. Bromine-containing compounds used as cure site monomers can include vinyl bromide, 1-bromo-2,2-difluoroethylene, perfluoroallyl bromide, 4-bromo-1,1,2-trifluorobutene, 4-bromoperfluoro-1-butene, 4-bromo-3,3,4,4-tetrafluoro-1-butene, bromotrifluoroethylene, and perfluorobromo-vinyl ether.

Example 3.3. Terpolymer with Cyanovinyl Ether-Containing Cure Site Monomer

A cure site monomer containing a cyanovinyl ether is selected for the polymerization of a terpolymer comprising a fluoroolefin, and strong acid and a cure site monomer. Cyanovinyl ether-containing compounds used as cure site monomers can include perfluoro(8-cyano-5-methyl-3,6-dioca-1-octene) and perfluoro(9-cyano-5-methyl-3,6-dioxa-1-octene).

Example 4

Preparation of Other Liquid Materials

Example 4.1. Synthesis of NAFION® in $CO_2$

Scheme 7. Synthesis of NAFION® in $CO_2$.

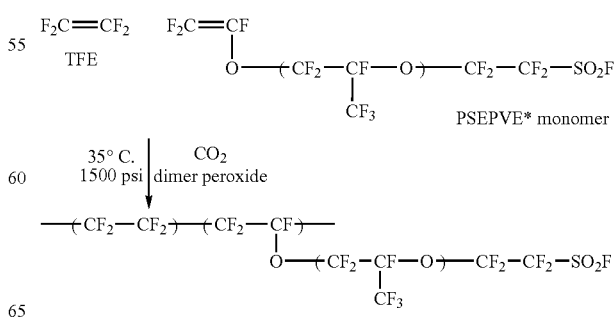

Example 4.2. Synthesis of Poly(TFE-Nb-PSEPVE).
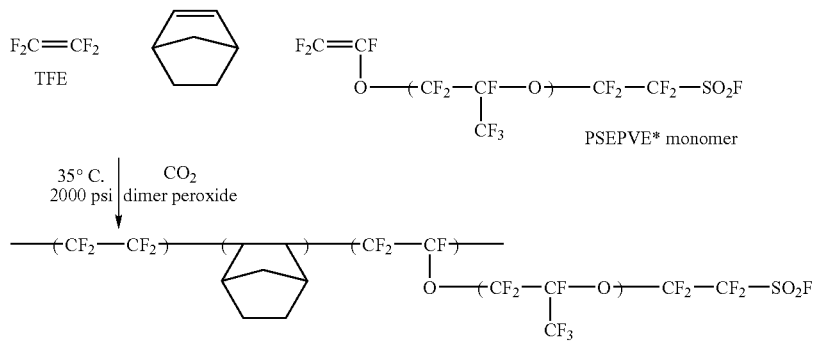
Example 4.3. Synthesis of Poly(TFE-PDD-PSEPVE)
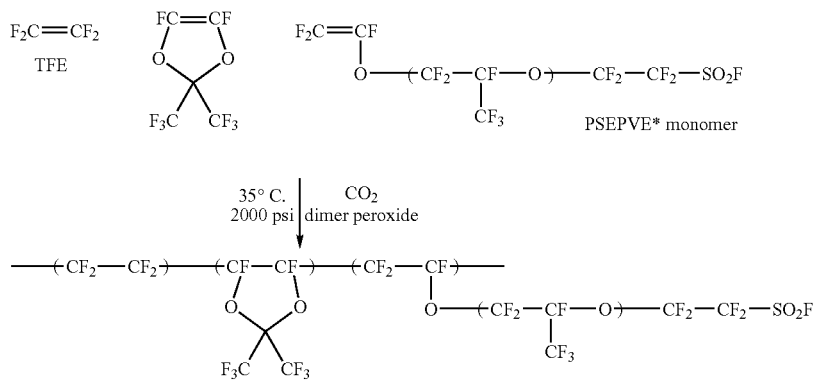
Example 4.4. Synthesis of a Norbornene Derivative.
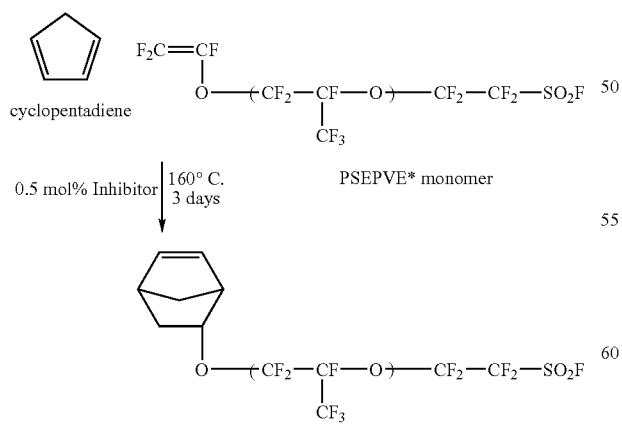
1.1:1 cyclopentadiene:PSEPVE mol ratio
Inhibitor = 3,5-di-tert-butylphenol Example 4.5. Vinyl Alcohol Containing PEM.

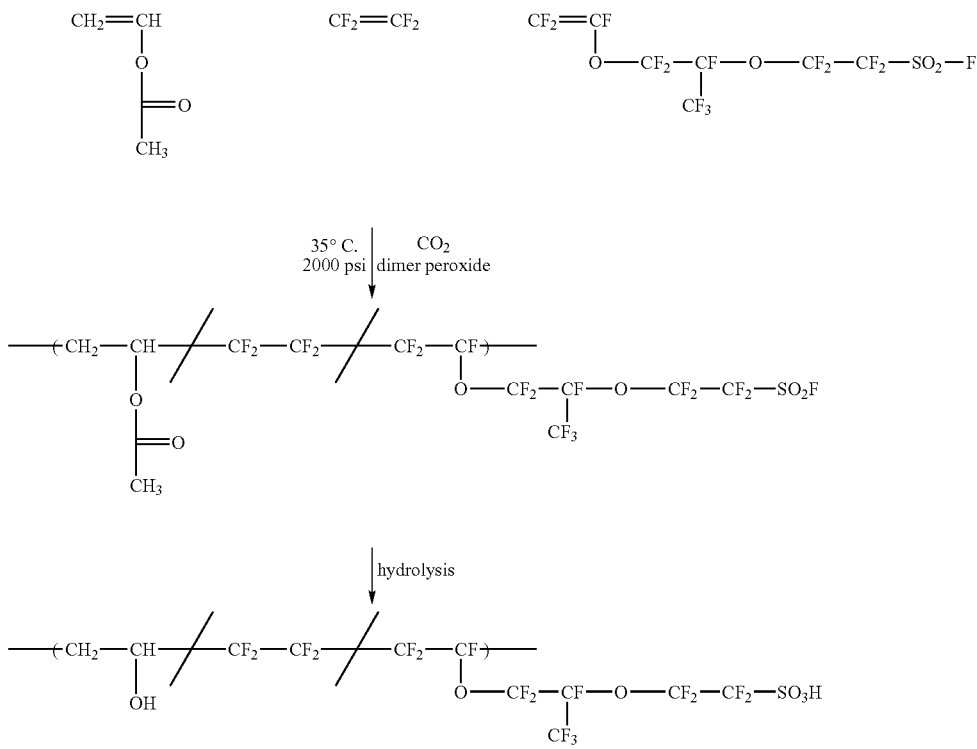

Example 5

Synthesis of Precursor to Proton Conductive Materials

Example 5.1. Synthesis of Styrene Sulfonate Ester

To a round bottom flask, 4-vinyl benzenesulfonyl chloride (37.5 mmol), 3,3,4,4,5,5,6,6,7,7,8,8,8-tridecafluoro-1-octanol (37.5 mmol), triethylamine (10 mL), and pyridine (20 mL) are added under Ar flow. The resulting slurry is stirred at room temperature for 20 hours (h). The reaction mixture is then poured into excess hydrochloric acid-ice bath to quench triethylamine. The aqueous solution is extracted with diethyl ether three times, and the combined ether layer is washed with water, 10% NaOH solution, and 10% NaCl solution sequentially. The ether solution is then dried over $MgSO_4$ for 1 h. $MgSO_4$ is then filtered out and diethyl ether is removed by vacuum evaporation. The resulting styrene sulfonate ester is a yellow solid with a melting temperature around 40° C.

Example 5.2. Synthesis of Styrene Sulfonate Ester

To a round bottom flask, 4-vinyl benzenesulfonyl chloride (37.5 mmol), 2,2,3,3,4,4,5,5,6,6,7,7,7-tridecafluoro-1-heptanol (37.5 mmol), triethylamine (10 mL), and pyridine (20 mL) are added under Ar flow. The resulting slurry is stirred at room temperature for 20 h. The reaction mixture is then poured into excess hydrochloric acid-ice bath to quench triethylamine. The aqueous solution is extracted with diethyl ether three times, and the combined ether layer is washed with water, 10% NaOH solution, and 10% NaCl solution sequentially. The ether solution is then dried over $MgSO_4$ for 1 h. $MgSO_4$ is then filtered out and diethyl ether is removed by vacuum evaporation.

Example 6

Preparation of Proton Exchange Membranes

Example 6.1. Preparation of EW1900 Proton Exchange Membranes 70 wt % S-PFPE and 30 wt % styrene sulfonate ester are mixed at room temperature. The mixture is heated above 40° C. and becomes a homogeneous yellow liquid. The liquid precursor is poured onto a preheated glass slide. A standard steel spacer is used to control the membrane thickness. The liquid precursor is chemically crosslinked by irradiation with UV light ($\lambda$=365 nm) for 10 min under nitrogen purge. The resulting membrane is in the ester form, transparent and slightly yellow.

Figure 4:
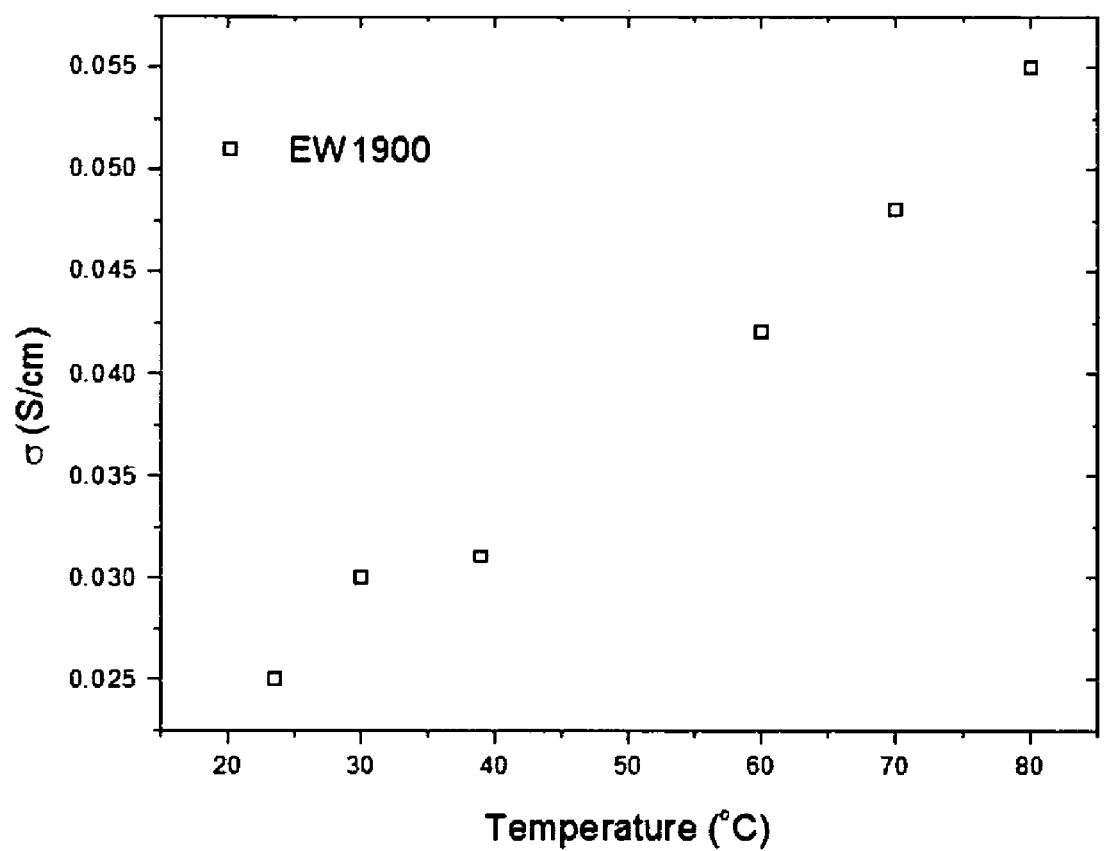
FIG. 4 is a plot showing the conductivity of an embodiment of a presently disclosed proton exchange membrane with an equivalent weight of 1900 under fully hydrated conditions.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water. The produced PEM has an equivalent of 1900 g/mol. The conductivity of the PEM at fully hydrated conditions is measured by AC impedance and the results are shown in FIG. 4.

Example 6.2. Preparation of EW1250 Proton Exchange Membranes 60 wt % S-PFPE and 40 wt % styrene sulfonate ester are mixed at room temperature. The mixture is heated above 40° C. and became a homogeneous yellow liquid. The liquid precursor is poured onto a preheated glass slide. A standard steel spacer is used to control the membrane thickness. The liquid precursor is chemically crosslinked by irradiation with UV light ($\lambda=365$ nm) for 10 min under nitrogen purge. The resulting membrane is in the ester form, transparent and slightly yellow.

Figure 5:
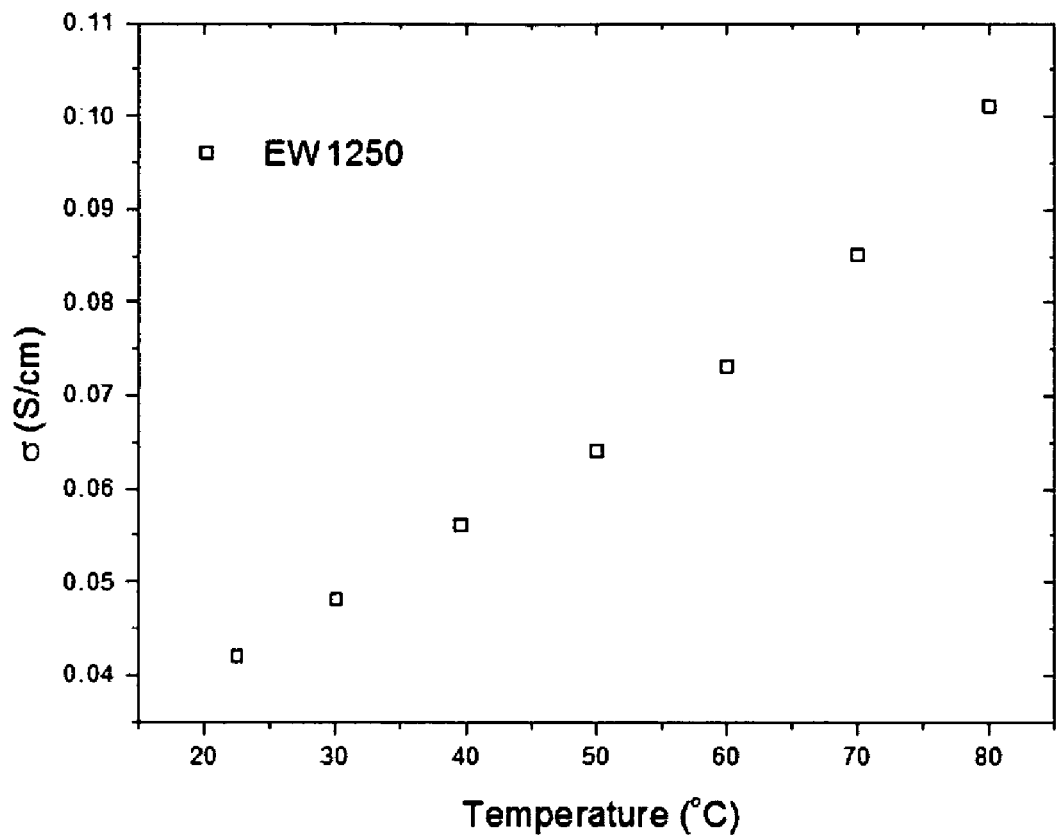
FIG. 5 is a plot showing the conductivity of an embodiment of a presently disclosed proton exchange membrane with an equivalent weight of 1250 under fully hydrated conditions.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water. The produced PEM has an equivalent of 1250 g/mol. The conductivity of the PEM at fully hydrated conditions is measured by AC impedance and the results are shown in FIG. 5.

Example 6.3. Preparation of EW850 Proton Exchange Membranes 50 wt % S-PFPE and 50 wt % styrene sulfonate ester are mixed at room temperature. The mixture is heated above 40° C. and becomes a homogeneous yellow liquid. The liquid precursor is poured onto a preheated glass slide. A standard steel spacer is used to control the membrane thickness. The liquid precursor is chemically crosslinked by irradiation with UV light ($\lambda=365$ nm) for 10 min under nitrogen purge. The resulting membrane is in the ester form, transparent and slightly yellow.

Figure 6:
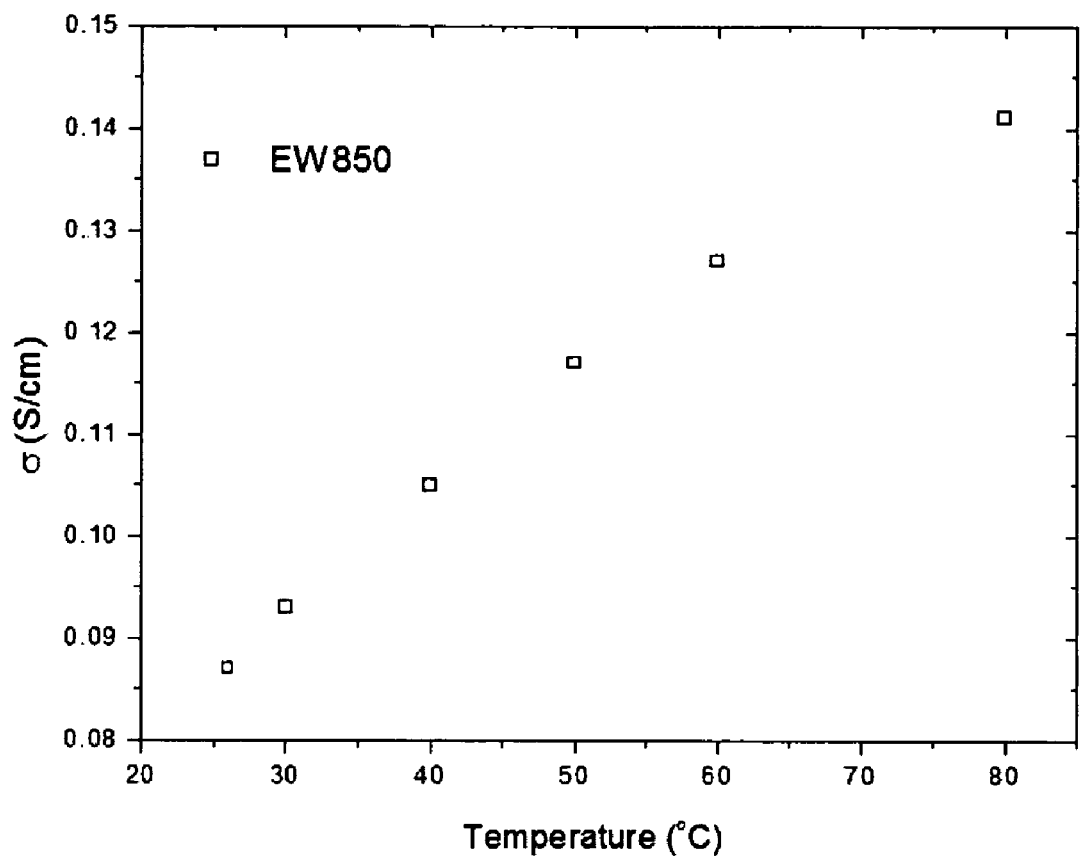
FIG. 6 is a plot showing the conductivity of an embodiment of a presently disclosed proton exchange membrane with an equivalent weight of 850 under fully hydrated conditions.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water. The produced PEM has an equivalent of 850 g/mol. The conductivity of the PEM at fully hydrated conditions is measured by AC impedance and the results are shown in FIG. 6.

Example 6.4. Preparation of EW660 Proton Exchange Membranes 40 wt % S-PFPE and 60 wt % styrene sulfonate ester are mixed at room temperature. The mixture is heated above 40° C. and becomes a homogeneous yellow liquid. The liquid precursor is poured onto a preheated glass slide. A standard steel spacer is used to control the membrane thickness. The liquid precursor is chemically crosslinked by irradiation with UV light ($\lambda=365$ nm) for 10 min under nitrogen purge. The resulting membrane is in the ester form, transparent and slightly yellow.

Figure 7:
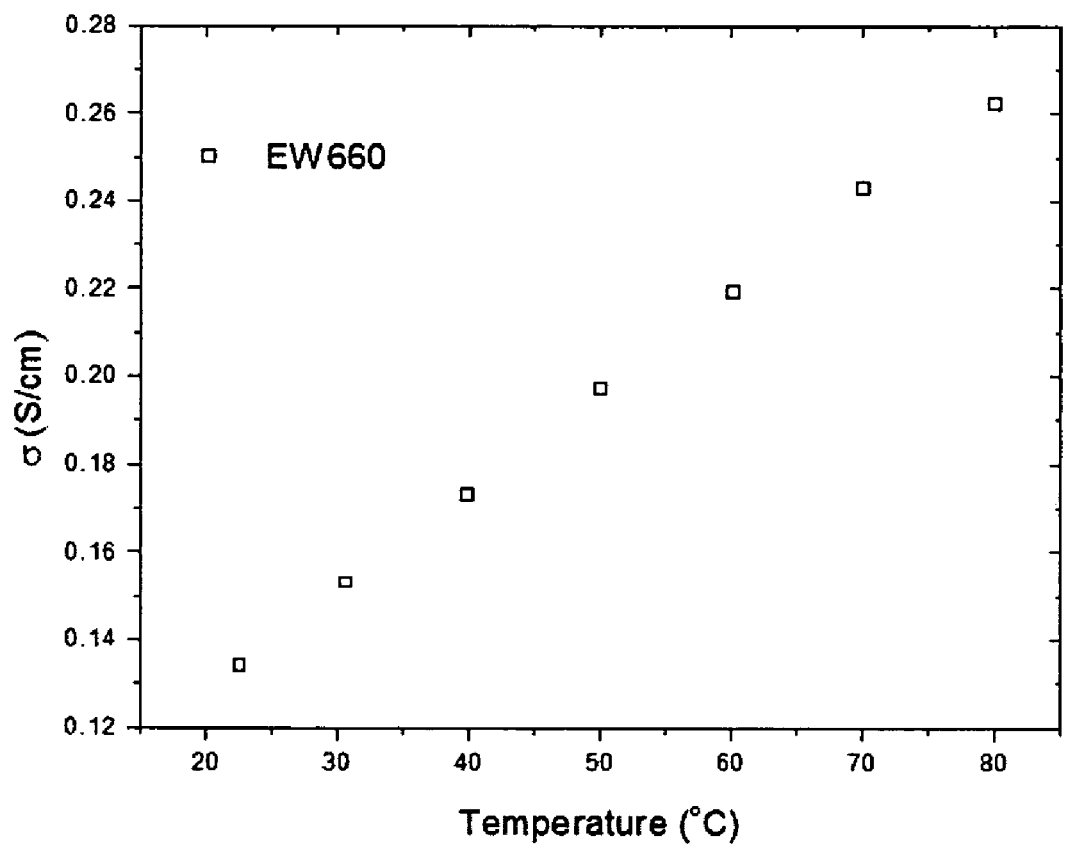
FIG. 7 is a plot showing the conductivity of an embodiment of a presently disclosed proton exchange membrane with an equivalent weight of 660 under fully hydrated conditions.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water. The produced PEM has an equivalent of 660 g/mol. The conductivity of the PEM at fully hydrated conditions is measured by AC impedance and the results are shown in FIG. 7.

Example 6.5. Preparation of EW550 Proton Exchange Membranes 30 wt % S-PFPE and 70 wt % styrene sulfonate ester are mixed at room temperature. The mixture is heated above 40° C. and became a homogeneous yellow liquid. The liquid precursor is poured onto a preheated glass slide. A standard steel spacer is used to control the membrane thickness. The liquid precursor is chemically crosslinked by irradiation with UV light ($\lambda=365$ nm) for 10 min under nitrogen purge. The resulting membrane is in the ester form, transparent and slightly yellow.

Figure 8:
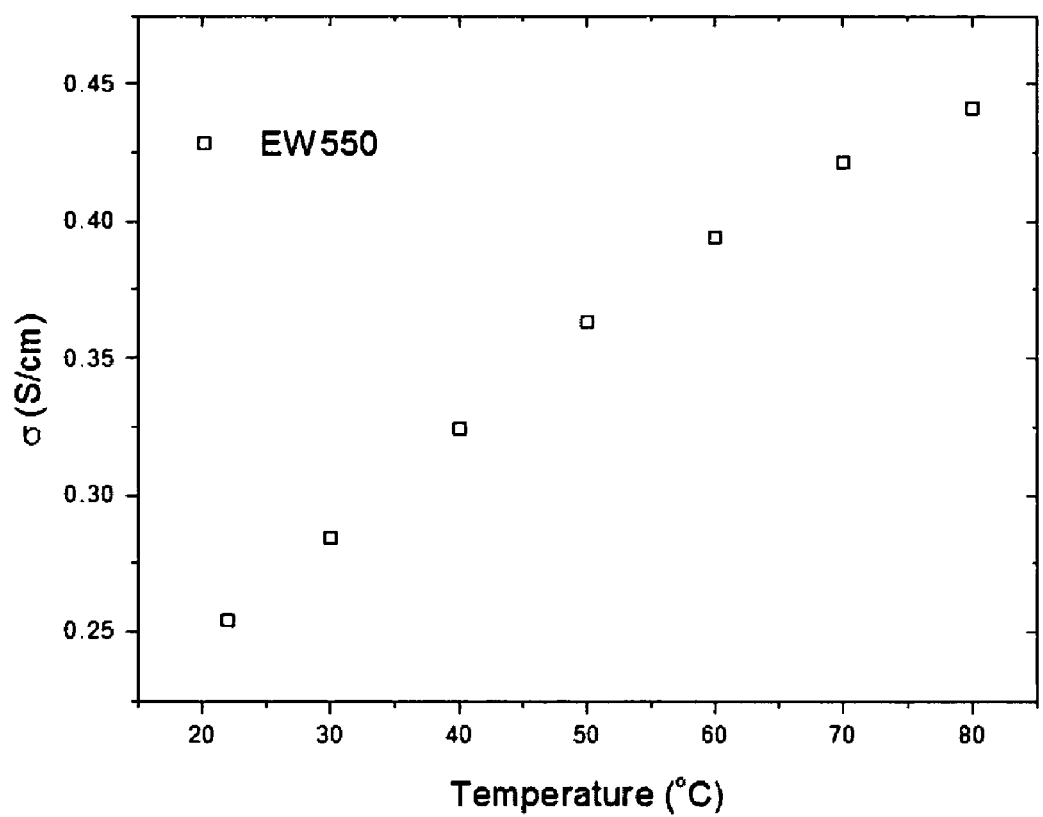
FIG. 8 is a plot showing the conductivity of an embodiment of a presently disclosed proton exchange membrane with an equivalent weight of 550 under fully hydrated conditions.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water. The produced PEM has an equivalent of 550 g/mol. The conductivity of the PEM at fully hydrated conditions is measured by AC impedance and the results are shown in FIG. 8.

Example 7

Fabrication of High Surface Area PEMs by Soft-Lithography Technique

Fabrication of PEMs with Shark-Skin Patterns

S-PFPE and styrene sulfonate ester are mixed in desired ratios. The mixture is heated above 40° C. and became a homogeneous yellow liquid. The liquid precursor is poured onto a preheated silicon wafer with shark-skin patterns. A standard steel spacer is used to control the membrane thickness. The liquid precursor is chemically crosslinked by irradiation with UV light ($\lambda=365$ nm) for 10 min under nitrogen purge. The patterned membrane is released from the silicon wafer after curing. The resulting membrane is in the ester form, transparent and slightly yellow.

To convert the sulfonate ester group into sulfonic acid, the membrane is immersed in a mixture of 30% NaOH aqueous solution and methanol (5:6 by volume) overnight and then refluxed for 10 h. The membrane is then rinsed with water and stirred with fresh 20 wt % HCl solution four times over 24 h. The resulting membrane is in the acid form. Residual HCl is removed by washing with water.

Scanning electron micrographs of the PEMs with shark-skin pattern before and after hydrolysis are shown in FIGS. 2A and 2B. The feature size of the shark-skin pattern is 2 μm in width and 8 μm in height. By employing the shark-skin patterns, the surface area of the patterned PEMs is about five times bigger than corresponding flat PEMs. As indicated by the figure, high fidelity patterns are easily obtained by soft litho approach. After hydrolysis, the patterns are swelled due to sorption of water, but the features are maintained.

Example 8

Conformal Application of Catalyst onto the PEM

Example 8.1. Deposition of Catalyst onto PEM by Electro-Spray Technique

A catalyst including platinum or platinum dispersed on carbon is deposited onto a three-dimensional PEM with shark-skin patterns by electro-spray technique. FIGS. 12A and 12B show scanning electron micrographs of the PEMs with a deposited catalyst.

Example 8.2. Deposition of Catalyst onto PEM by Vapor Deposition

Platinum catalyst is deposited onto a three-dimensional PEM with shark-skin patterns by vapor deposition. FIG. 13 shows a scanning electron micrograph of the PEMs with a deposited catalyst.

Example 9

Fabrication of Three-Dimensional MEAs

Example 9.1. The liquid precursor approach also provides a three-dimensional membrane electrode assembly (MEA) and fuel cell stacks. FIGS. 14A and 14B display a schematic representation of a MEA structure based a three-dimensional membrane and two-dimensional electrodes with conformal or non-conformal catalyst loading.

Example 9.2. The liquid precursor approach also provides a three-dimensional (3-D) membrane electrode assembly (MEA) and fuel cell stacks. FIG. 15 displays a schematic representation of a MEA structure based a three-dimensional membrane and three-dimensional electrodes with conformal catalyst loading.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method for preparing a polymeric electrolyte, the method comprising:
   (a) providing a 100% solids liquid precursor material, wherein the 100% solids liquid precursor material comprises from about 70% by weight to about 100% by weight polymerizable materials, and wherein a component comprising more than about 30% by weight of the 100% solids liquid precursor material is liquid at room temperature; and
   (b) treating the 100% solids liquid precursor material to form a polymeric electrolyte.

2. The method of claim 1, wherein the 100% solids liquid precursor material comprises a material selected from the group consisting of a proton conductive material, a precursor to a proton conductive material, and combinations thereof.

3. The method of claim 1, wherein the 100% solids liquid precursor material comprises a material selected from the group consisting of a monomer, an oligomer, a macromonomer, an ionomer, and combinations thereof.

4. The method of claim 3, wherein at least one of the monomer, the oligomer, the macromonomer, and the ionomer comprises a functionalized perfluoropolyether (PFPE) material.

5. The method of claim 4, wherein the functionalized perfluoropolyether (PFPE) material comprises a backbone structure selected from the group consisting of:

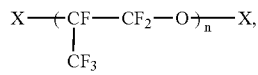

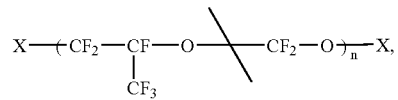

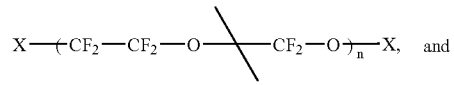

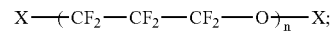

wherein X comprises an endcapping group, and n is an integer from 1 to 100.

6. The method of claim 4, wherein the functionalized PFPE material is selected from the group consisting of:

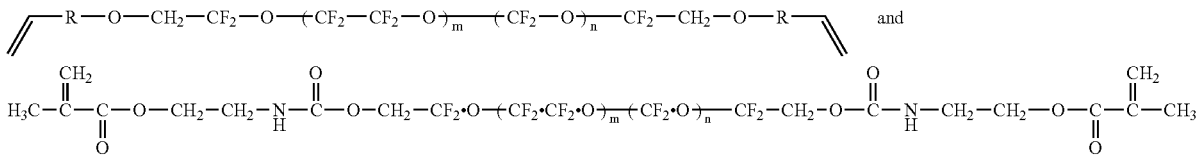

wherein R is selected from the group consisting of alkyl, substituted alkyl, aryl, and substituted aryl, and wherein m and n are each independently integers from 1 to 100.

7. The method of claim 3, wherein the ionomer is selected from the group consisting of a sulfonic acid material, a derivative of a sulfonic acid material, and a phosphoric acid material.

8. The method of claim 7, wherein the derivative of a sulfonic acid material comprises a material selected from the group consisting of:

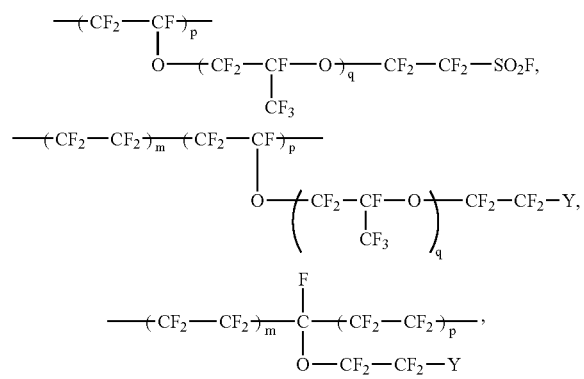

-continued

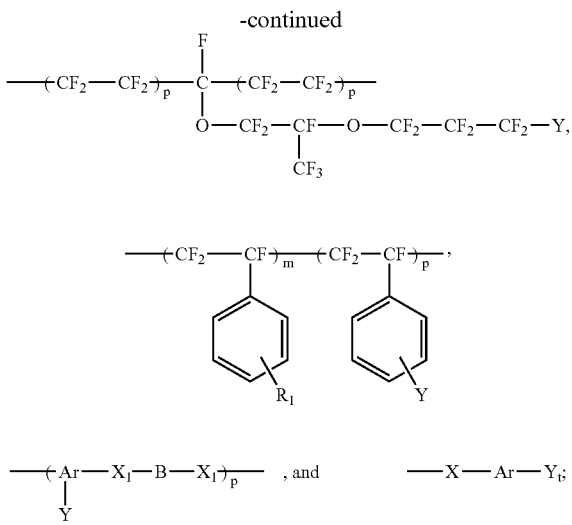

wherein:
Y is selected from the group consisting of —$SO_2F$ and —$SO_3H$;
$R_1$ is selected from the group consisting of alkyl, substituted alkyl, hydroxyl, alkoxyl; fluoroalkenyl, cyano, and nitro;
$X_1$ is selected from the group consisting of a bond, O, S, SO, $SO_2$, $CO_1$, $NR_2$, and $R_3$;

wherein:
$R_2$ is selected from the group consisting of hydrogen, alkyl, substituted alkyl, aryl, and substituted aryl; and
$R_3$ is selected from the group consisting of alkylene, substituted alkylene, aryl, and unsubstituted aryl;
Ar is selected from the group consisting of aryl and substituted aryl;
B is 1,2-perfluorocyclobutylene;
t is an integer from 1 to 3;
m is an integer from 0 to 1000;
p is an integer from 1 to 1000; and
q is an integer from 1 to 5.

9. The method of claim 1, wherein the treating of the 100% solids liquid precursor material comprises a process selected from the group consisting of:
(a) a curing process, wherein the curing process comprises a process selected from the group consisting of a thermal process, a photochemical process, and an irradiation process, and wherein the irradiation process comprises irradiating the liquid precursor material with radiation selected from the group consisting of gamma rays and an electron beam;
(b) a chemical modification process, wherein the chemical modification process comprises a crosslinking process;
(c) a network forming process; and
(d) combinations thereof.

10. The method of claim 1, wherein the 100% solids liquid precursor material comprises a crosslinkable material.

* * * * *

UNITED STATES PATENT AND TRADEMARK OFFICE
CERTIFICATE OF CORRECTION

PATENT NO.        : 7,435,495 B2
APPLICATION NO.   : 11/040317
DATED             : October 14, 2008
INVENTOR(S)       : DeSimone et al.

It is certified that error appears in the above-identified patent and that said Letters Patent is hereby corrected as shown below:

Title Page, Item (75) Inventors: "Zhillian Zhou" should read -- Zhilian Zhou --

Column 32: "  " should read --  --

Column 35:
Lines 39-54: " —— CF₂ —— " should read -- $(CF_2)_x$ --

Column 49:
Line 19: "— X — Ai— $Y_t$" should read -- — $X_1$ — Ai— $Y_t$ --

Line 30: "$SO_2$, $CO_2$," should read -- $SO_2$, CO --

Signed and Sealed this

Ninth Day of December, 2008

JON W. DUDAS
*Director of the United States Patent and Trademark Office*